(12) United States Patent
Lee et al.

(10) Patent No.: US 6,650,880 B1
(45) Date of Patent: Nov. 18, 2003

(54) WIRELESS DATA COMMUNICATIONS USING FIFO FOR SYNCHRONIZATION MEMORY

(75) Inventors: Sherman Lee, Rancho Palos Verdes, CA (US); Vivian Y. Chou, Alhambra, CA (US); John H. Lin, Downey, CA (US)

(73) Assignee: Broadcom Corporation, Irvine, CA (US)

( * ) Notice: Subject to any disclaimer, the term of this patent is extended or adjusted under 35 U.S.C. 154(b) by 395 days.

(21) Appl. No.: 09/593,583

(22) Filed: Jun. 12, 2000

(51) Int. Cl.$^7$ ................................................. H04B 1/06
(52) U.S. Cl. .................... 455/259; 455/41; 455/265; 375/372
(58) Field of Search .................... 455/412, 41, 556, 455/557, 259, 265; 375/372, 354, 359

(56) References Cited

U.S. PATENT DOCUMENTS 5,757,872 A * 5/1998 Banu et al. ................. 375/372
6,266,385 B1 * 7/2001 Roy et al. ................... 375/372

OTHER PUBLICATIONS

"Specification of the Bluetooth System", Version 1.0B, Dec. 1, 1999, pp. 1–1082.
Dave Watola, "DS2 Digital Receiver Signal Processing Description", Apr. 7, 1998, pp. 1–12.

* cited by examiner

*Primary Examiner*—Lee Nguyen
(74) *Attorney, Agent, or Firm*—Christie, Parker & Hale, LLP

(57) ABSTRACT

A wireless (radio) receiver receives RF signals carrying data synchronized with a first clock. The wireless receiver demodulates the RF signals to extract the data signals and the first clock signals. The wireless receiver uses the first clock signals as write signals to write the data signals in a first-in first-out memory device (FIFO). The data signals stored in the FIFO may be read out with read signals synchronized to a second clock. In one example, a host associated with the wireless receiver reads out data signals stored in the FIFO with read signals synchronized to the system clock of the host receiver. In another example, the wireless receiver includes a data processing circuit (e.g., including forward error correction, de-whitening, and cyclical redundancy check circuits) that reads out data signals stored in the FIFO with read signals synchronized to the system clock of the wireless receiver.

A microprocessor system architecture is disclosed which allows for the selective execution of programmed ROM microcode or, alternatively, RAM microcode if there has been a correction or update made to the ROM microcode originally programmed into the system. Patched or updated RAM microcode is utilized or executed only to the extent of changes to the ROM microcode, otherwise the ROM microcode is executed in its normal fashion. When a patch is received, it is loaded into system RAM along with instructions or other appropriate signals to direct the execution of the patched or updated microcode from RAM instead of the existing ROM microcode. Various methods are presented for selecting the execution of the appropriate microcode depending upon whether there have been changes made to it.

24 Claims, 24 Drawing Sheets

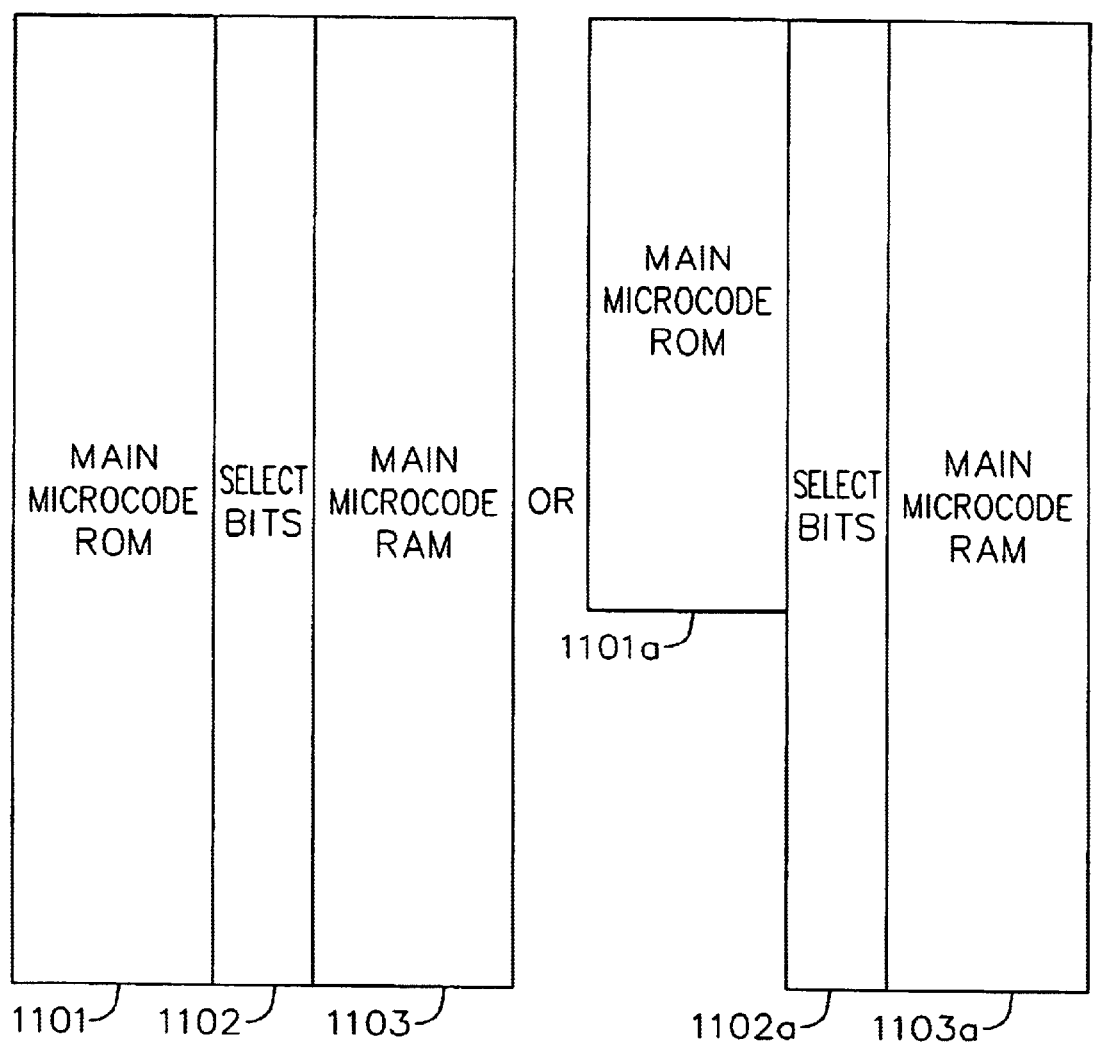

SELECT METHOD #2

SELECT METHOD #3—UNPATCHED

SELECT METHOD #3-PATCHED

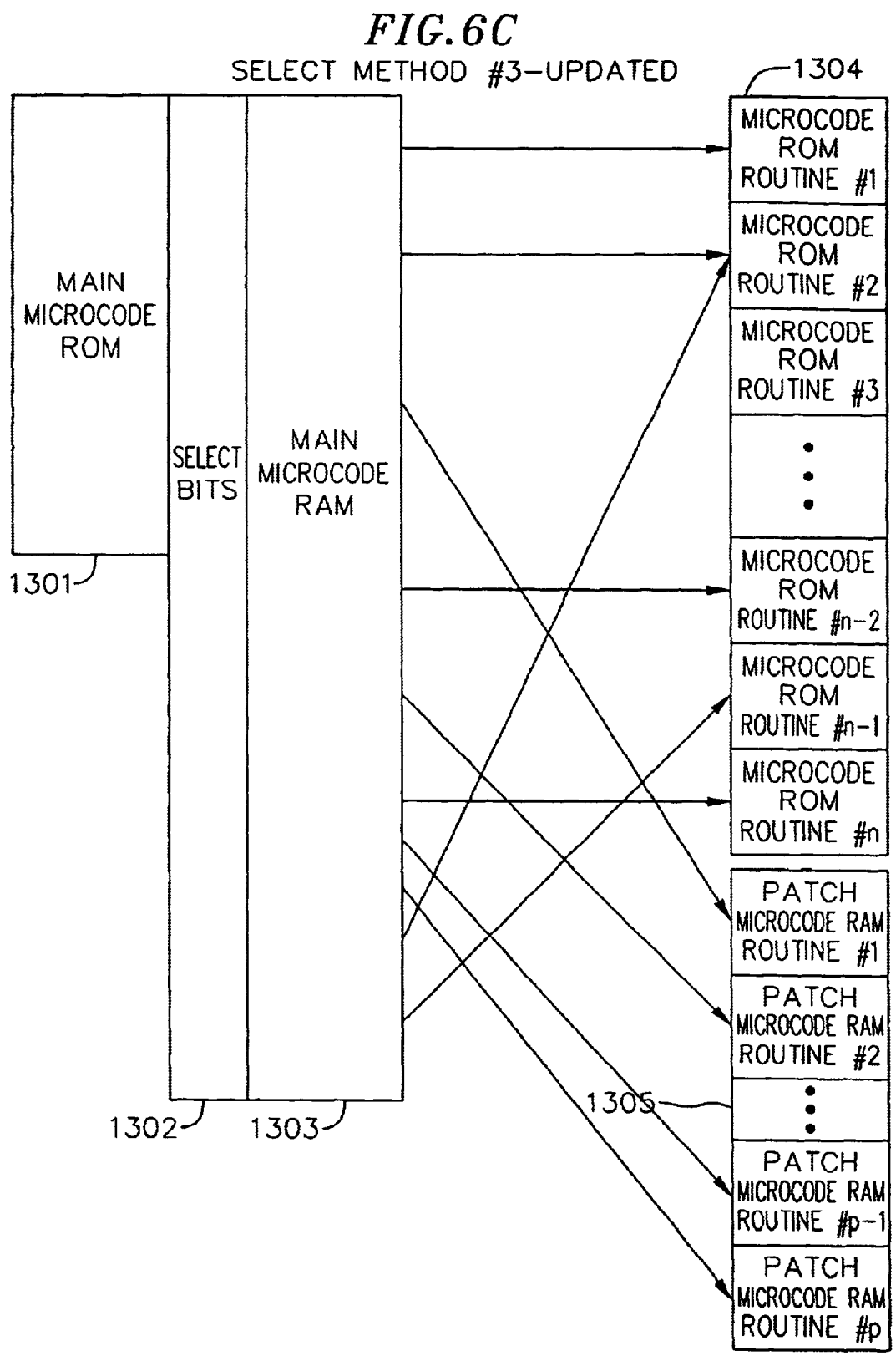

FIG. 7A
VALID/TRAP METHOD—UNPATCHED
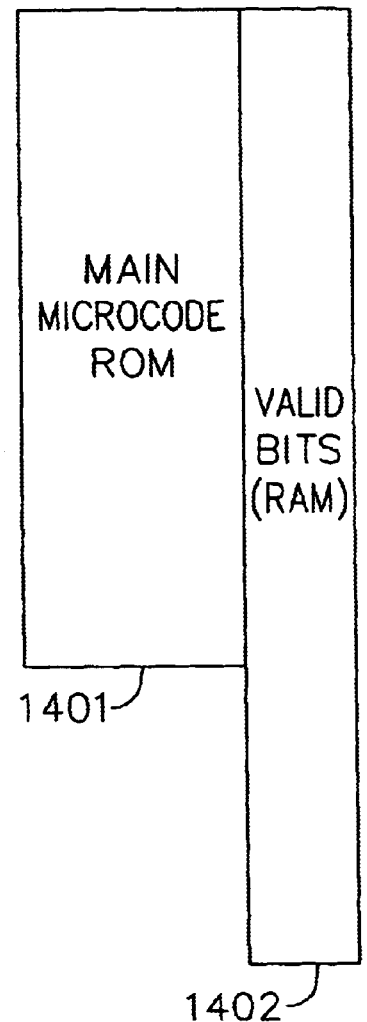
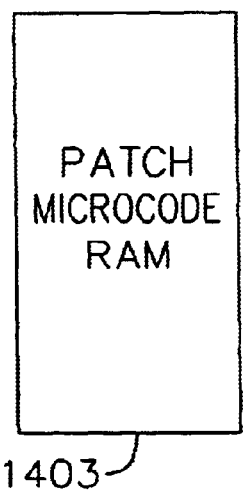

VALID/TRAP METHOD-PATCHED

VALID/TRAP METHOD-UPDATED

INDEX METHOD—UNPATCHED

INDEX METHOD—PATCHED

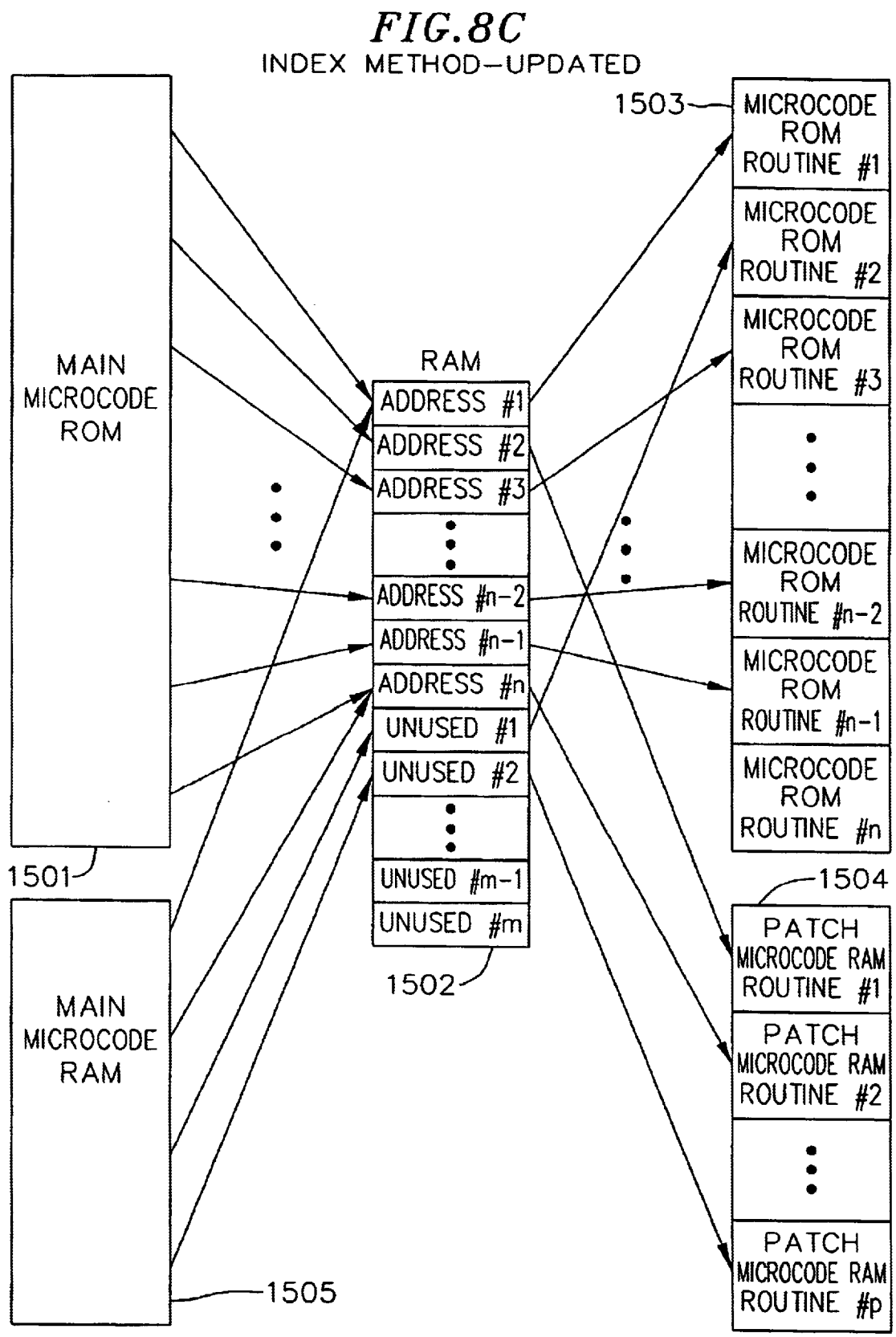

WIRELESS DATA COMMUNICATIONS USING FIFO FOR SYNCHRONIZATION MEMORY

BACKGROUND

1. Field of the Invention

This invention relates to wireless communication and more particularly to an apparatus that receives transmission of data synchronized to a clock that is out of phase with the clock of the apparatus.

This invention also relates to microprocessor system architecture, and more particularly to a microprocessor architecture that allows read-only memory (ROM) microcode to be effectively altered or enhanced without the need to reprogram or replace the ROM.

2. Description of Related Art

Bluetooth is the name of a well known and open technical specification for wireless communication of data and voice. Bluetooth allows the replacement of very short range cables (wires) now used to connect one device to another with one universal short-range radio link; for example, a computer can thereby communicate with its printer via a radio link instead of a cable. Bluetooth is characterized by operation in the 24 GHz and at variable transmission power depending on the distance between devices. For example, for a power class 2 Bluetooth device, the transmission power ranges from 1 mW to 2.5 mW. Bluetooth also allows computing devices to connect to a communicating device via a radio link. For example, a computer can communicate with a nearby cell phone via a radio link to access the Internet. Bluetooth units (radios) connect to each other in "piconets", which are formed by a master unit connecting up to seven slave units. In a piconet, the slave units are synchronized to the master unit's clock and hopping sequence. See "Specification of the Bluetooth System-Core v1.0b" available from the Bluetooth Special Interest Group at its web site.

A typical Bluetooth conforming radio includes an RF (radio frequency) circuit and a baseband circuit. The RF circuit receives a frequency modulated electromagnetic signal (i.e., FM signal) carrying data synchronized to the clock signal ("external clock") of another Bluetooth radio. The baseband circuit includes a demodulator circuit that extracts the data and the external clock signal from the FM signal (symbol timing recovery). The baseband circuit also includes a PLL (phase lock loop) circuit that synchronizes the phase of the internal clock of the baseband circuit to the phase of the external clock to allow data processing circuits of the baseband to process the extracted data. The PLL circuit is necessary because even if the internal clock and the external clock may have substantially the same frequency, they may not have the same phase. Furthermore, interference to the FM signal as it travels through the air may also distort the representation of the frequency of the external clock in the FM signal.

A microprocessor is a central processing unit (CPU) enclosed in one integrated circuit (IC) package. Because of their small size and low cost, microprocessors have revolutionized digital system design technology, giving the designer the capability to create structures that were previously uneconomical. Microprocessors are used in a wide variety of applications. They can function as a CPU in a general purpose computer or as a processor unit in a special purpose, automated system.

Microprocessor systems usually incorporate several different types of memory devices to hold data for processing and instructions for system control. Memory devices come in a wide variety of forms. Two of the more common forms are generally referred to as "read-only memory" (ROM) and "random access memory" (RAM). In its simplest form, sometimes called "mask-programmed", a ROM memory device is manufactured with fixed contents. The binary information stored in the ROM is made permanent during the hardware production of the unit and cannot subsequently be altered. Such a ROM memory unit performs the read operation only; it does not have a write capability. ROM is most often used to hold microcode, the lowest level instructions that directly control a microprocessor.

By contrast, a RAM is a data storage device that can perform both the read and write function. A system CPU uses its RAM as a storage area for data, calculation results, and program instructions, drawing on this storage as necessary to perform the tasks required by programs. Its binary contents can easily be changed during operation and its stored data is typically erased or lost when the device incorporating it is powered off. Part of the initial "power-up" or boot routine for microprocessor systems includes the loading of desired or necessary code into RAM according to the system design.

Microprocessor systems may also incorporate some type of "non-volatile" memory, such as a hard-disk. Like RAM, such memory can usually be read or written to, but unlike RAM its content is preserved until over-written, even without system power.

More recent varieties of ROM provide for some limited programming capability after manufacture. PROM ("programmable read-only memory") devices can be programmed by the end user, but only once. EPROM ("erasable programmable read-only memory") can be erased and then reprogrammed, but must be removed from the system to do so. EEPROM ("electronic erasable read-only memory") can be erased and programmed electrically some limited number of times with standard supply voltages while in the circuit. However, such devices come with increased cost and limitations of their own. For example, EPROM must be removed from the system to be reprogrammed, and EEPROM must be erased and reprogrammed in its entirety, not selectively. For many processing systems, especially those used to perform set, repetitive tasks, it is desirable to use the cheapest and simplest (mask-programmed) ROM, with minimal reliance on more expensive RAM or other types of memory devices.

However, in even the simplest microprocessor system it may be desirable to alter the execution of the ROM microcode to, for example, correct errors in the code or add new capabilities to it. The disclosed invention allows for alterations in the processing of ROM microcode without incurring the added expense and complexity of integrating some form of programmable ROM into the system.

SUMMARY

In accordance with one aspect of the invention, a wireless device (e.g. radio) includes a receiver coupled to a first-in first-out memory device (FIFO). The, e.g. RF receiver includes a RF circuit that receives RF signals via an antenna, and a demodulator circuit that decodes the RF signals to data signals and recovered clock signals. The RF receiver stores the data signals into the FIFO using the recovered clock signals as write signals. In one implementation, a host device reads the data out from the FIFO with read signals synchronized to the system clock of the host device. In one variation, the write signals and the read signals are of similar frequencies. Thus, the host device can read the data received as RF signals without synchronizing its system clock to the recovered clock signals.

In another embodiment, a data processing circuit reads the data out from the FIFO with read signals synchronized to the system clock of the data processing circuit. In one implementation, the write signals and the read signals are of similar frequencies. Thus, the data processing circuit can process the data received as RF signals without synchronizing its system clock to the recovered clock signals. In one variation, the host device is coupled to the data processing circuit to receive the processed data.

Accordingly, the function performed in the prior and by PLL circuits are performed by FIFOs so that data received as RF signals may be processed by circuits without synchronizing their system clock to the recovered clock signals.

In accordance with another aspect of the invention, a microprocessor system architecture allows for the selective execution of programmed ROM microcode or, alternatively, RAM microcode if there has been a correction or update made to the ROM microcode originally programmed into the system. Patched or updated RAM microcode is utilized or executed only to the extent of changes to the ROM microcode, otherwise the ROM microcode is executed in its normal fashion.

When a patch is received, it is loaded into system RAM along with instructions or other appropriate signals to direct the execution of the patched or updated microcode from RAM instead of the existing ROM microcode. Those skilled in the art will appreciate and understand that a variety of techniques can be utilized to direct the execution of patched or updated RAM micocode rather than corresponding ROM microcode, only a few of which are discussed in some detail below.

BRIEF DESCRIPTION OF THE DRAWINGS

FIGS. 4 and 4A illustrate alternative embodiments of a memory architecture in which main microcode ROM and main microcode RAM share a common memory address area, along with a "select" RAM bit used to control the selection of main microcode ROM or main microcode RAM for execution. In FIG. 4A, all microcode ROM is associated with an area of microcode RAM. In FIG. 4B, all microcode ROM shares a common address with microcode RAM, but additional address areas for microcode RAM are allocated to accept new microcode.

FIGS. 6A, 6B, and 6C illustrate a memory architecture in which the ROM is divided into main portion and a "routine" portion consisting of more detailed and lengthy instruction. A specified RAM bit is used to control the selection of main microcode ROM or main microcode RAM, and associated "routine" ROM or patches loaded into RAM. FIG. 6A illustrates the selection of microcode ROM in the absence of any patches. FIG. 6B illustrates the selection of patch microcode RAM when present, and FIG. 6C illustrates the selection of patch microcode RAM when new routines are available.

FIGS. 7A, 7B, and 7C illustrate a memory architecture in which a specified RAM bit is used to control the selection of main microcode ROM or patch microcode RAM. FIG. 7A illustrates the selection of main microcode ROM in the absent of any changes. FIG. 7B illustrates the selection of patch microcode RAM when changes are present, and FIG. 7C illustrates the selectionof patch microcode RAM when new instructions are present.

FIGS. 8A, 8B, and 8C illustrate a memory architecture in which an "index" method is used to select the execution of ROM or RAM microcode as desired. FIG. 8A shows how ROM routines are mapped into RAM for execution in the absence of any patches or updates. FIG. 8B illustrates how RAM-mapped ROM routines are directed to patch microcode RAM for execution when existing RAM microcode is modified. FIG. 8C illustrates how new micocode routines are executed.

DETAILED DESCRIPTION

Figure 1:
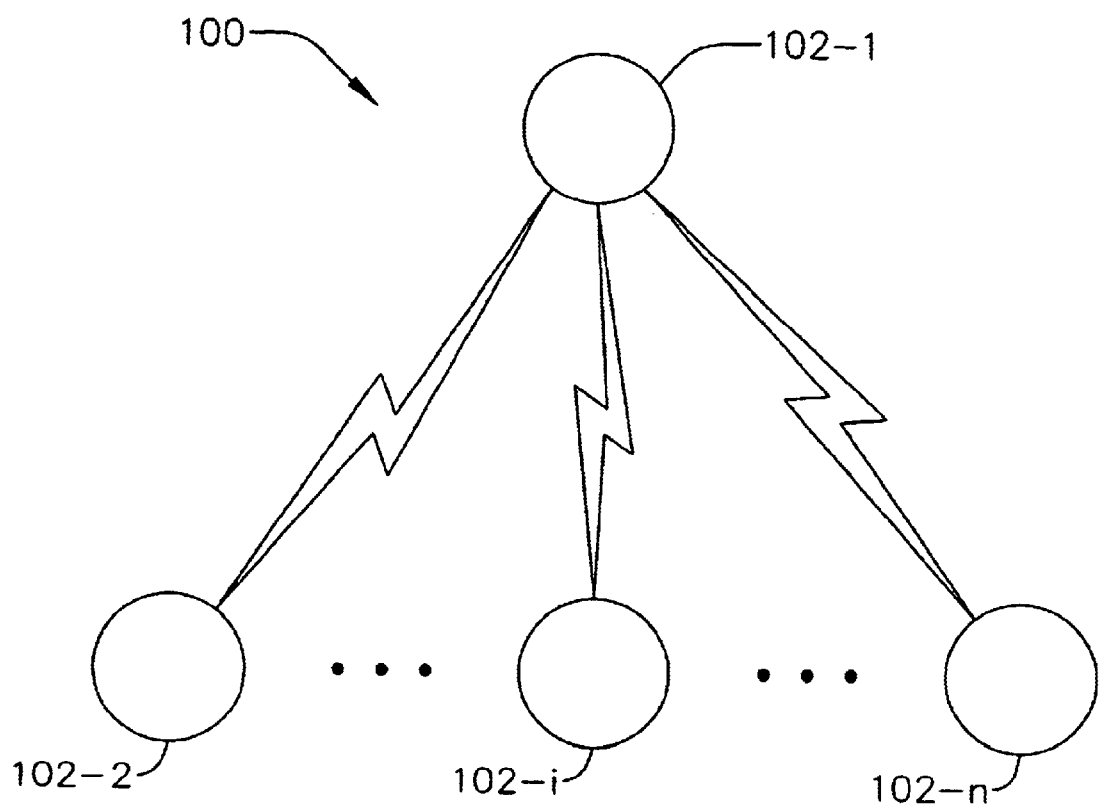
FIG. 1 illustrates, in a block diagram, a wireless network involving wireless devices.

A wireless network 100 (FIG. 1) includes a plurality of wireless devices 102-1, 102-2 ... 102-i ... 102-n ($2 \leq i \leq n$). Wireless network 100 includes radio frequency (RF) networks, optical networks, and infrared networks. Wireless network 100 is, for example, a Bluetooth piconet where wireless device 102-1 is a master Bluetooth radio and wireless devices 102-2 to 102-n are slave Bluetooth radios. As one skilled in the art understands, a Bluetooth piconet can form part of a larger Bluetooth scatternet.

Figure 2A:
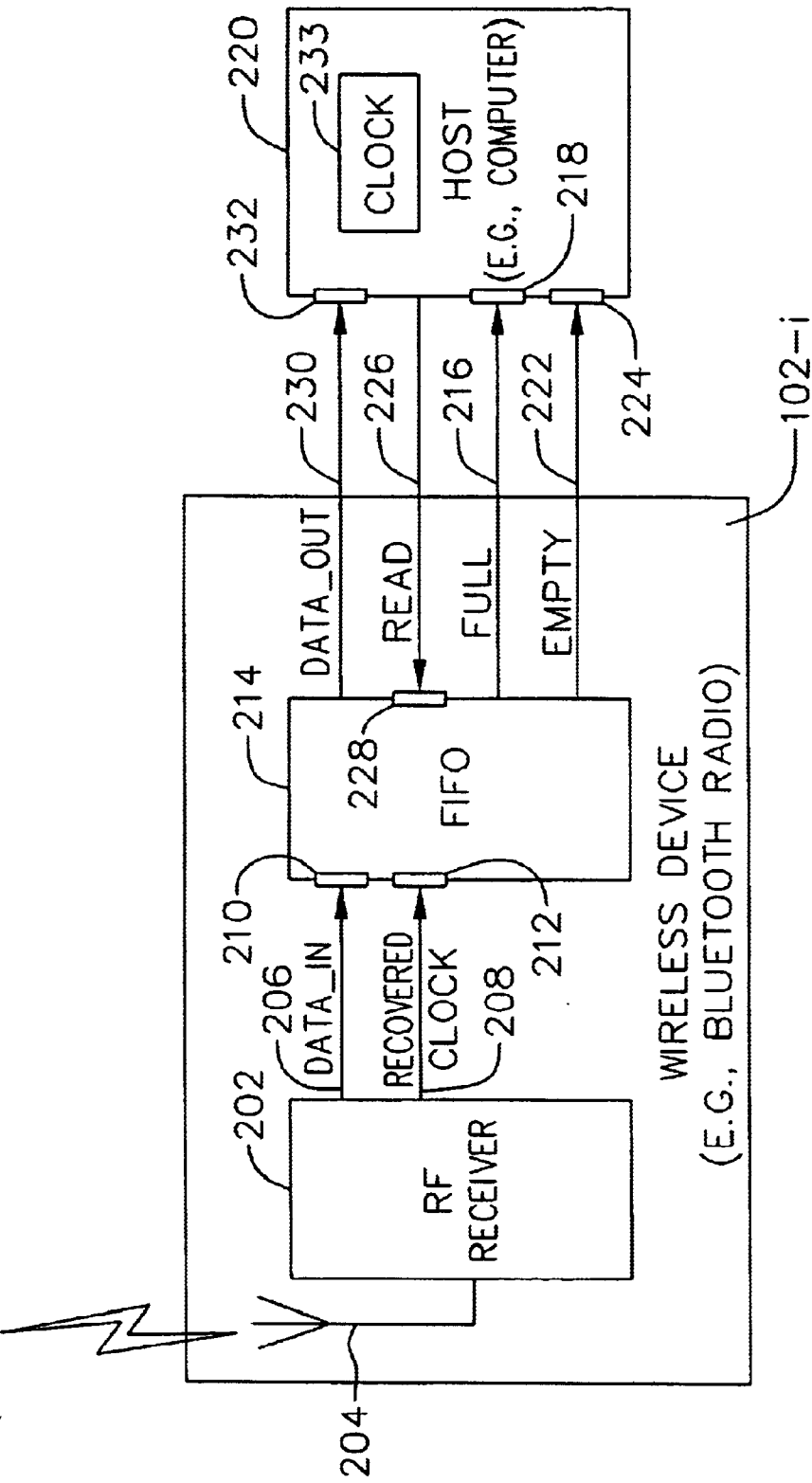
FIG. 2A illustrates, in a block diagram, a wireless device of FIG. 1 in accordance with one embodiment of the invention.

In accordance with one aspect of the invention hereafter referred to as "thin baseband/host-based", wireless device 102-i (FIG. 2A) performs radio and baseband modulation functions in circuitry. A host 220 performs all other baseband, link management, and protocol stack functions through software. Host 220 includes a high performance and low latency host processor (e.g., reduced instruction-set computing processors) capable of handling time-critical link management functions. Such processors are available from ARM Ltd. of Cambridge, England, MIPS Technologies, Inc. of Mountain View, ARC Cores, Inc. of San Jose, and Tensillica of Santa Clara.

Wireless device 102-i includes in one embodiment a conventional radio frequency (RF) receiver 202 (FIG. 2A) that receives RF signals from another Bluetooth radio via an antenna 204. The RF signals carry data synchronized to the clock ("external clock") of the another Bluetooth radio. RF receiver 202 decodes the RF signals to recover the data signals and the external clock signals (symbol timing recovery). RF receiver 202 respectively outputs the data signals and the external clock signals via respective lines 206 and 208.

Lines 206 and 208 are respectively coupled to input terminals 210 and 212 of a conventional first-in first-out memory device (FIFO) 214. FIFO 214 receives the external clock signals ("recovered clock signals") as write signals from RF receiver 202. When FIFO 214 receives an active recovered clock signal on terminal 212, FIFO 214 writes the data signal received on terminal 210 from RF receiver 202 into one of its empty memory locations indicated by a write pointer. Thus, the input data to FIFO 214 is in response to the recovered clock signals.

When FIFO 214 is full, it outputs an active full signal via a line 216 coupled to a terminal 218 of host 220. Conversely, when FIFO 214 is empty, it outputs an active empty signal via a line 222 coupled to a terminal 224 of host 220. Host 220 reads the data stored in FIFO 214 by driving an active read signal via a line 226 coupled to input terminal 228 of FIFO 214. In response to the active read signal on its terminal 228, FIFO 214 outputs the data in the memory location pointed to by a read pointer via a line 230 coupled to an input terminal 232 of host 220. Since the read signal from host 220 is synchronized with a clock 233 of host 220, the data read out of FIFO 214 is synchronized with clock 233.

Figure 2B:
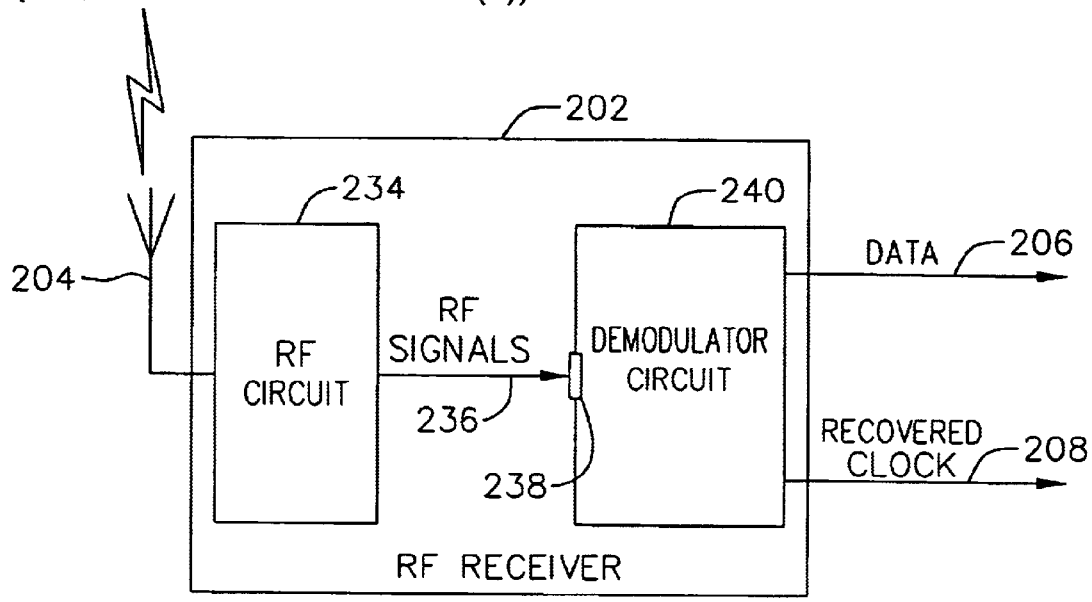
FIG. 2B illustrates, in a block diagram, a radio frequency (RF) receiver of FIG. 2A.

In one embodiment, RF receiver 202 comprises a suitable RF circuit 234 (FIG. 2B) that receives the FM signals transmitted by other Bluetooth radio(s). For a description of one embodiment of RF circuit 234, see U.S. patent application Ser. No. 09/591,925, entitled "Image-Rejection I/Q Demodulators," filed Jun. 12, 2000, and U.S. patent application Ser. No. 09/592,016, entitled "Receiver Architecture Employing Low Intermediate Frequency And Complex Filtering," filed Jun. 12, 2000, which are incorporated herein by reference in the entirety. Another suitable embodiment of RF circuit 234 is Radio Module PBA31 301 from Ericsson.

RF circuit 234 outputs the RF signals via a line 236 coupled to a terminal 238 of a suitable demodulator circuit 240. Demodulator circuit 240 extracts the data signals and the recovered clock signals from the RF signals. Demodulator circuit 240 outputs the data signals and the recovered clock signals via respective lines 206 and 208. Demodulator circuit 240 is, for example in one embodiment, implemented by Verilog source code listed in Appendix A. Another example of a suitable demodulator is modeled by C source code listed in Appendix B. One skilled in the art can translate the C source code to Verilog source code to synthesize a suitable demodulator.

Figure 2C:
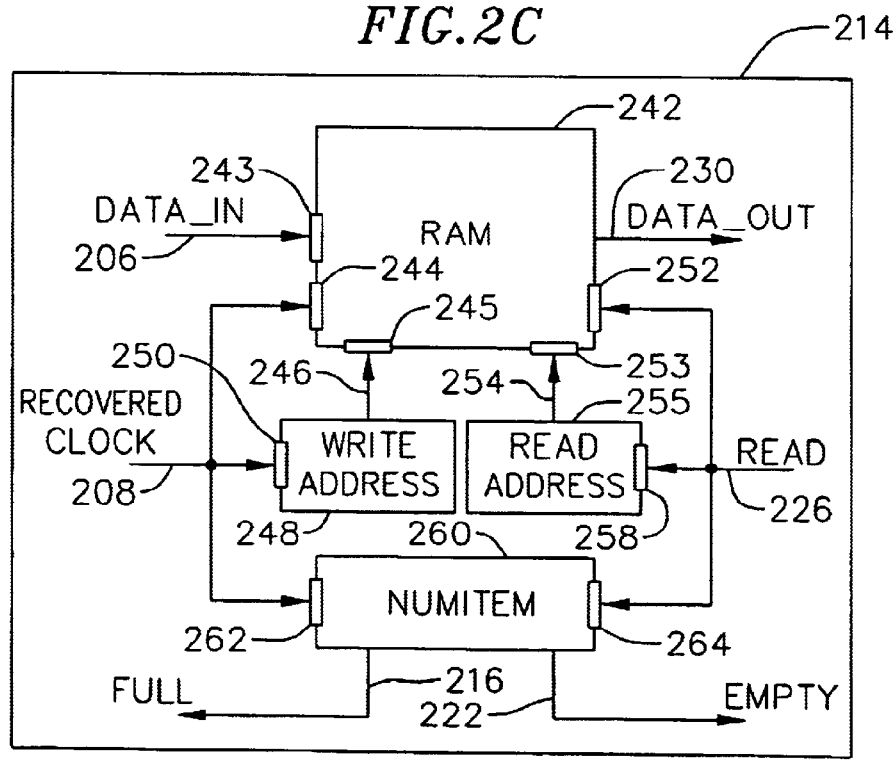
FIG. 2C illustrates, in a block diagram, a first-in first-out memory device (FIFO) of FIG. 2A.
Figure 2D:
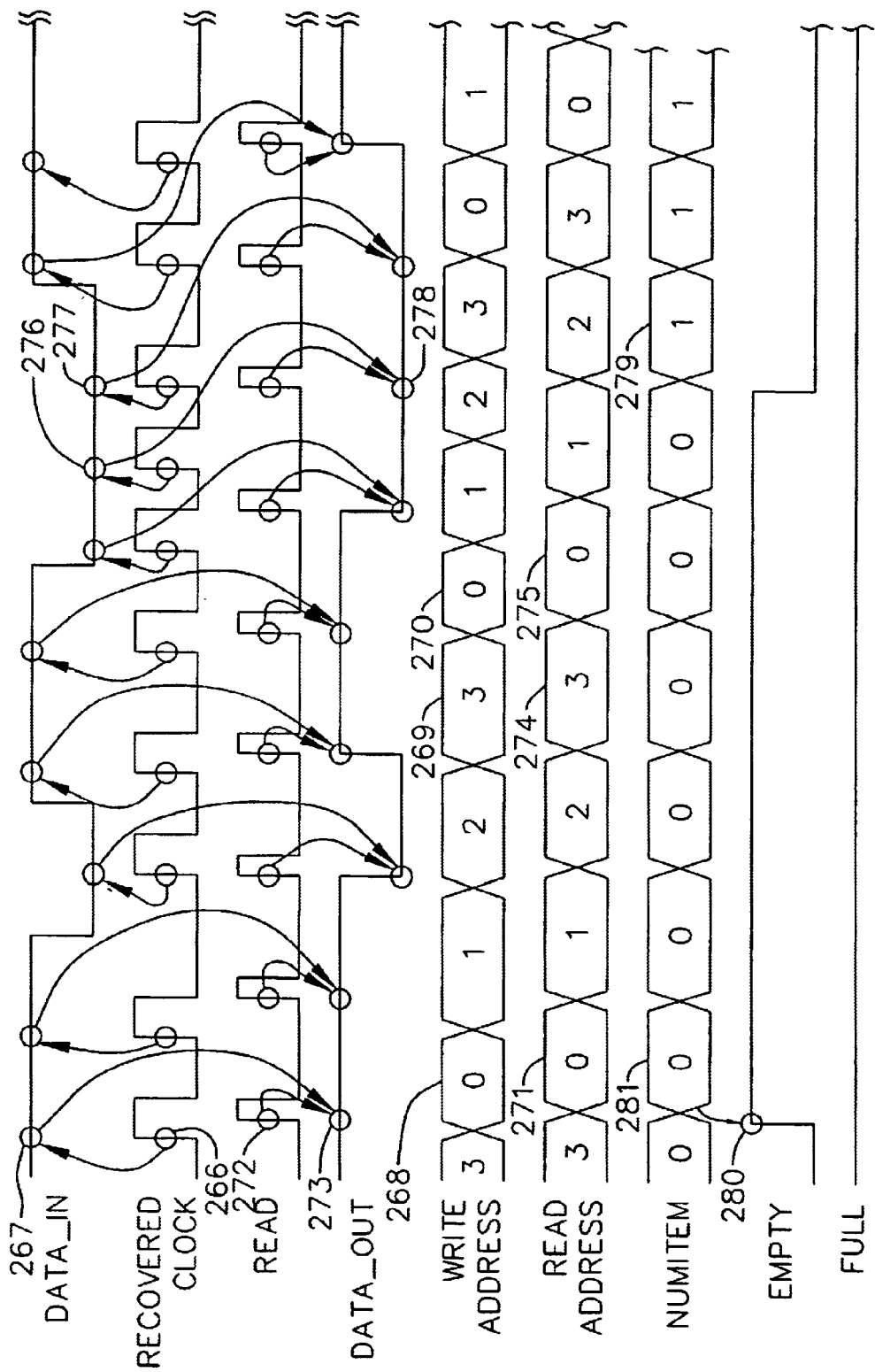
FIG. 2D illustrates, in a timing diagram, the input and output signals from the FIFO of FIG. 2C in accordance with one embodiment of the invention.

In one embodiment, FIFO 214 includes a random access memory (RAM) 242 (FIG. 2C) that receives data on a terminal 243 coupled to line 206, write signals (i.e., recovered clock signals) on a terminal 244 coupled to line 208, and write addresses on a terminal 245 coupled to a line 246 of a counter (write pointer) 248. RAM 242 stores the data (e.g., data 267 in FIG. 2D) received on a terminal 243 in the write address (e.g., address 268 in FIG. 2D) indicated by counter 248 each time RAM 242 receives an active write signal (e.g., signal 266 in FIG. 2D) on terminal 243. Counter 248 increments the write address each time counter 248 receives an active write signal (e.g., signal 266 in FIG. 2D) on a terminal 250 coupled to line 208. Counter 248 wraps around once it reaches the total number of memory locations in RAM 242 (e.g., the transition from address 269 to 270).

RAM 242 further receives a read signal on a terminal 252 coupled to line 226, and a read address on a terminal 253 coupled to a line 254 of a counter (read pointer) 255. RAM 242 outputs the data (e.g., data 273 in FIG. 2D) in the memory address (e.g., address 271 in FIG. 2D) indicated by counter 255 each time RAM 242 receives an active read signal (e.g., signal 272 in FIG. 2D) on a terminal 252. Similar to counter 248, counter 255 increments the read address each time counter 255 receives an active read signal (e.g., signal 272 in FIG. 2D) on a terminal 258 coupled to line 226. Counter 255 wraps around once it reaches the total number of memory locations in RAM 242 (e.g., transition from address 274 to 275 in FIG. 2D).

A counter 260 stores a numitem that indicates whether RAM 242 is full or empty. Counter 260 increments the numitem each time it receives an active write signal on a terminal 262 coupled to line 208. Conversely, counter 260 decrements the numitem each time it receives an active read signal on a terminal 264 coupled to line 226. For example, when two data signals (e.g., data 276 and 277 in FIG. 2D) are written into RAM 242 while only one data signal (e.g., data 278 that corresponds to data 276 in FIG. 2D) is read out of RAM 242, numitem (e.g., numitem 279 in FIG. 2D) has a value of one. Counter 260 outputs an active full signal via line 216 when the numitem is equal to the total number of memory locations in RAM 242. Conversely, counter 260 outputs an active empty signal (e.g., signal 280 in FIG. 2D) via line 222 when the numitem (e.g., numitem 281 in FIG. 2D) is equal to zero.

In one embodiment, host 220 read data out from FIFO 214 at relatively the same rate as data is being written into FIFO 214 (i.e., the frequency of the recovered clock). If data is being read out from FIFO 214 at substantially the same rate as data is being written into FIFO 214, the size of FIFO 214 can be minimized (e.g., 2 bits). However, the write rate may not be as constant as the read rate because the write signal is synchronized to the recovered clock. Thus, the size of FIFO 214 is equal to the product of the (1) variation between the write rate and the read rate (e.g., frequency variation between the recovered clock and the system clock) and (2) the length of the data to be transmitted. Specifically, the minimum required size of the FIFO 214 between any two times (e.g., $t_1$ and a $t_2$) may be defined as:

$$\int_{t_1}^{t_2} [F_{in}(t) - F_{out}(t)] dt$$

where $F_{in}(t)$ is the data rate into FIFO 214 as a function of time, and $F_{out}(t)$ is the data rate out from FIFO 214 as a function of time. In one implementation, FIFO 214 is a four bit FIFO.

In another embodiment, host 220 reads the data from FIFO 214 in bursts because host 220 operates at a higher clock speed than the recovered clock. Host 220 can allow the bits to be stored in FIFO 214 and read the data out in a burst before FIFO 214 overflows.

FIFO 214 is, for example in one embodiment, implemented by Verilog source code listed in Appendix C. As one skilled in the art understands, FIFOs can be implemented in a variety of ways by flip-flops, registers, memory arrays, random access memory (RAM), and other similar components.

As described above, FIFO 214 allows host 220 to read data signals transmitted from another Bluetooth radio without retiming its clock to the external clock of the other Bluetooth radio. Thus, the prior art PLL circuit is replaced here with one embodiment by a FIFO 214 that is both simple and inexpensive to implement. Accordingly, a Bluetooth radio utilizing FIFO 214 offers a more efficient design than other Bluetooth radios that utilize PLL circuits to retime their clocks.

In accordance with another aspect of the invention hereafter referred to as "host-based", wireless device 102-i performs all radio, baseband, and time-critical link management functions in circuitry rather than in the host. Host 220 performs all non-time critical link management and protocol stack functions (in software). Host 220 includes a host processor such as an X86 or 8051 based processor.

Wireless device 102-i includes a data processing circuit 302 (FIG. 3A) that reads and processes the data from FIFO 214. Data processing circuit 302 has terminals 318, 324, and 332 respectively coupled to lines 216, 222, and 230 of FIFO 214. To read data from FIFO 214, data processing circuit 302 drives an active read signal via a line 326 coupled to terminal 228 of FIFO 214.

In one embodiment, data processing circuit 302 includes a conventional forward error correction (FEC) decoding circuit 336 (FIG. 3B) having input terminal 338 coupled to line 230. FEC decoding circuit 336 uses correction bits embedded in the data to repair any error in the transmitted data received at terminal 338. If there is no error, FEC circuit 336 removes the correction bits from the data stream. This is as set forth in the Bluetooth specifications. FEC circuit 336 outputs the data stream via a line 340 to input terminal 342 of a de-whitening circuit 344.

Conventional de-whitening circuit 344 descrambles the data with a "whitening" word used to randomize the data from highly redundant patterns and to minimize DC bias in the packet. This is as set forth in the Bluetooth specifications. De-whitening circuit 344 outputs the data stream via a line 346 to input terminal 348 of a conventional cyclical redundancy check (CRC) circuit 350. CRC circuit 350 detects data transmission error by performing CRC checking. CRC circuit 350 outputs the data stream via a line 352 to input terminal 354 of a suitable FIFO 356.

FIFO 356 stores the data received from CRC circuit 350. FIFO 356 outputs the data via a line 349 coupled to input terminal 357 of a host interface 359. Host interface 359 reads data out from FIFO 356 (e.g., bits 370 to 377 in FIG. 3C) to an output line 330 coupled to terminal 232 of host 220 when host 220 outputs an inactive ready-to-receive signal (e.g., signal 378 in FIG. 3C) on a line 329 coupled to a terminal 361 of host interface 359. Host interface 359 includes a start bit and an end bit (e.g., bits 379 and 380, respectively, in FIG. 3C) at the start and the end of the data transmission to host 220. Host interface 359 is, for example, coupled to a XR16C850 UART (universal asynchronous receiver and transmitter) made by EXAR Corporation of Fremont, Calif., that forms part of host 220.

Figure 3A:
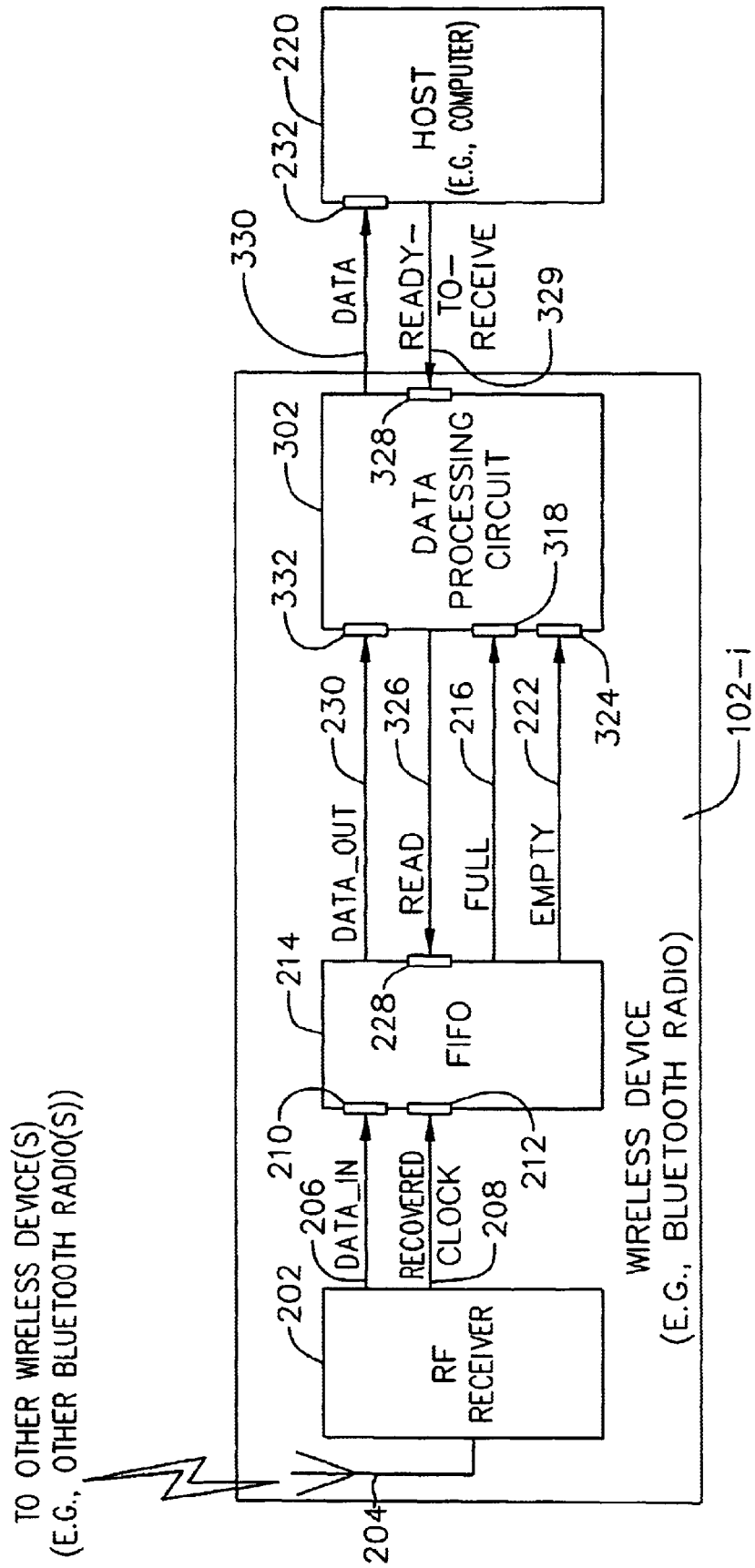
FIG. 3A illustrates, in a block diagram, a wireless device of FIG. 1 in accordance with another embodiment of the invention.

A microcontroller 358 controls the data flow through FIFO 214, FEC circuit 336, de-whitening circuit 344, CRC circuit 350, FIFO 356, and host interface 359. (Microcontroller is not the host, which as in FIG. 3A is external to date processing circuit 302.) To read data from FIFO 214 to FEC circuit 336, microcontroller 358 drives an active read signal via a line 326 coupled to terminal 228 of FIFO 214. Microcontroller 358 has terminals 360 and 362 respectively coupled to lines 216 and 224 of FIFO 214 to determine if FIFO 214 is full or empty. Microcontroller 358 may read data out from FIFO 214 at a constant rate or in bursts depending on the embodiment.

Microcontroller 358 also enables FEC circuit 336, de-whitening circuit 344, and/or CRC circuit 350 depending on the type of data received. Microcontroller 358 instructs FIFO 356 whether to accept or reject the data received from CRC 350 depending if FEC 336 or CRC 350 detects an error in the data. Microcontroller 358, for example, executes microcode listed in Appendix D.

A clock source 364 provides clock signals to FEC circuit 336, de-whitening circuit 344, CRC circuit 350, FIFO 356, microcontroller 358, and host interface 359. Data processing circuit 302 is, for example, implemented by Verilog source code listed in Appendix F.

In accordance with yet another aspect of the invention hereafter referred as "stand alone", wireless device 102-i performs the radio, the base, and the link management functions in circuitry. Host 220 is not necessary in this aspect because data processing circuit 302 includes application specific circuitry that allows wireless device 102-i to operate independently of a host. For example, wireless device 102-i may be a wireless headset that allows a user to receive signals from another Bluetooth radio enabled device.

Although one aspect of the invention has been described with reference to particular embodiments, the description is only of examples and should not be taken as a limitation. For example, although the above disclosure refers to the Bluetooth specifications, the present method and apparatus may be used in other wireless applications where the data received is synchronized to a clock of similar frequency but out of phase with the internal clock. This is not limited to RF, but includes optical and infrared communications. Furthermore, radio 102-i can be implemented as an integrated circuit (on a single chip) or as separate chips that can be coupled. Various other adaptations and combinations of features of the embodiments disclosed are within the scope of the invention as defined by the following claims.

As used herein, the term "patch" is intended to mean any correction, change, or alteration to the original microcode stored in a microprocessor system's read-only memory (ROM). The terms "patch" or "update" may also be used herein to refer to microcode developed after the original programming of system ROM microcode for the implementation of new instructions or routines.

As used herein, the term "microcode" is intended to mean the lowest level instructions that directly control a microprocessor.

There are several reasons why it might be desirable or even necessary to make changes in the programmed ROM of a microprocessor, corrections to existing code or the addition of new code being chief among them. For systems utilizing mask-produced (unalterable) ROM, such changes are not possible with existing memory and system architectures. Thus, to correct errors in the microcode, or to implement new capabilities, it is necessary to completely replace the defective or outmoded ROM devices if not the entire unit incorporating them, an expensive and inconvenient process.

The invention disclosed herein effectively allows for changes in otherwise unalterable ROM microcode, by loading microcode changes into allocated RAM and then providing for the selective execution of the existing ROM microcode or the changed RAM microcode. The disclosed techniques can be applied to any microprocessor system, but will be most beneficial for those systems that for economic or other reasons primarily rely on ROM memory devices that are programmed at system manufacture and incapable of alteration once programmed.

Depending upon the particular embodiment, as more fully discussed below, each address of at least one portion of the designated RAM address area(s) will contain one or more control or "select" bits to signal a change to existing ROM microcode. During program execution, when the select bit is detected, the system is directed to execute the changed RAM microcode rather than existing ROM microcode.

The RAM is organized into storage units that are larger than the ROM storage units, and logically divided into two sections. The first section of each RAM storage unit is of the same fixed size as each ROM storage unit, and is used to store the changed or new (patched) microcode. The second section of each RAM storage unit is used to control the ultimate selection of either original ROM or RAM microcode for system execution. For those skilled in the art, it is well understood how to implement a memory system design of the type described for the RAM.

A multiplexer has its inputs coupled, respectively, to the ROM and to that section of the patch RAM containing the patch microcode, if any. The select input terminal of the multiplexer is coupled to the second section of patch RAM, containing the signal telling the system whether it is to execute the ROM or the patched RAM microcode. This input select signal is used by the multiplexer to select either a ROM or a patch RAM routine for output. The output of the multiplexer, whether ROM or patch RAM, is then processed for further executed.

Patch microcode can be introduced into the system in a variety of ways. It can be received and taken into the system in the same manner as other forms of data by, for example, modem, wireless data link, disk, or CD. Once received, the patch may be stored in any non-volatile memory device accessible by the system, where it will be available for subsequent loading into the patch RAM. Alternatively, when initially received from an external source, the patch microcode may be simultaneously loaded into patch RAM (for immediate use) and into non-volatile memory for more permanent storage and future access.

There are a variety of methods for initiating the use of patch RAM microcode instead of or in addition to original ROM microcode, as discussed in the following embodiments.

FIGS. 4 and 4A illustrates an architecture in which ROM (1101 or 1101a), RAM (1103) and a RAM select bit share a common address. The select bit is used to determine whether the associated RAM or ROM instructions are to be executed.

Figure 3B:
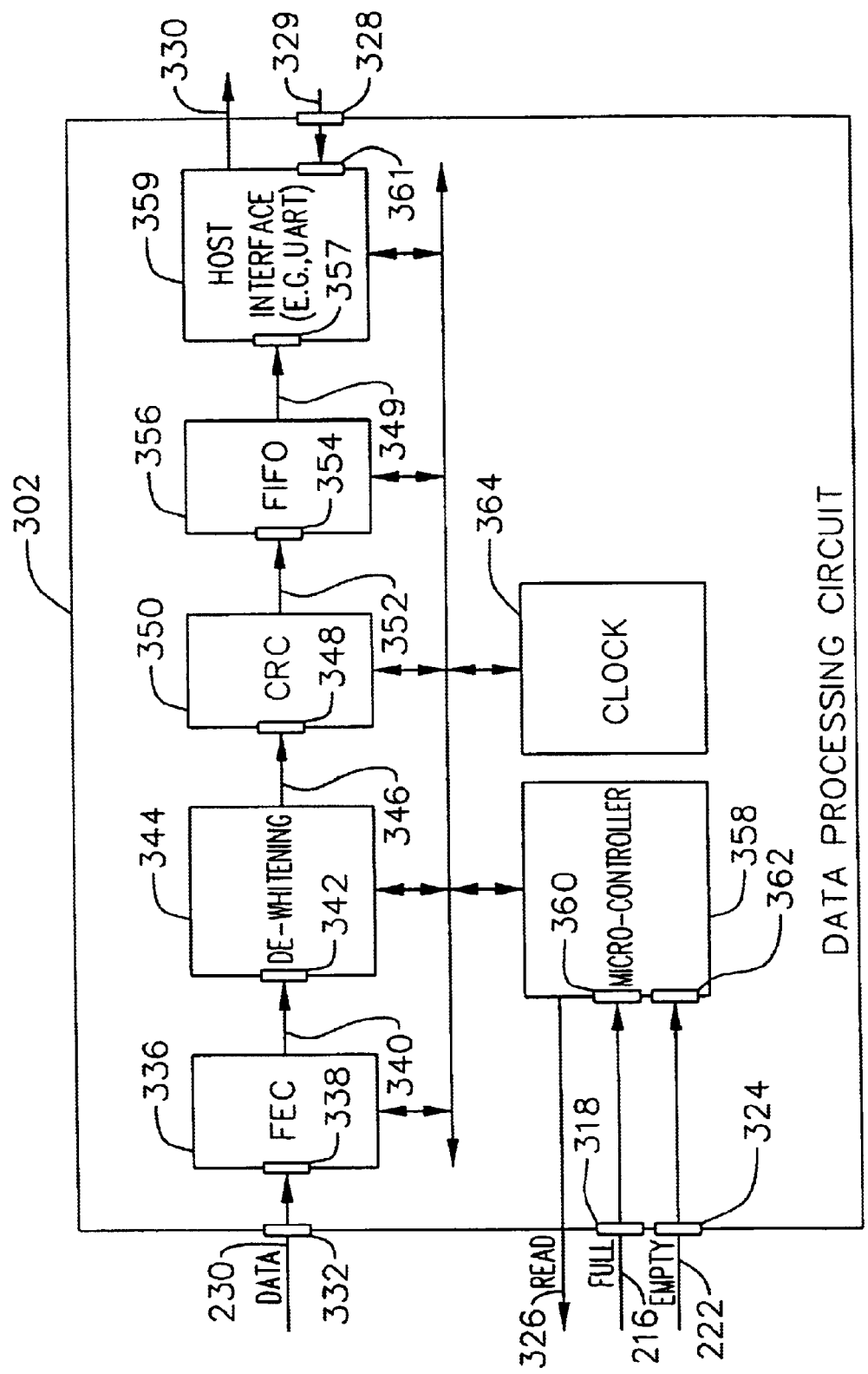
FIG. 3B illustrates, in a block diagram, a data processing circuit of FIG. 3A.
Figure 3C:
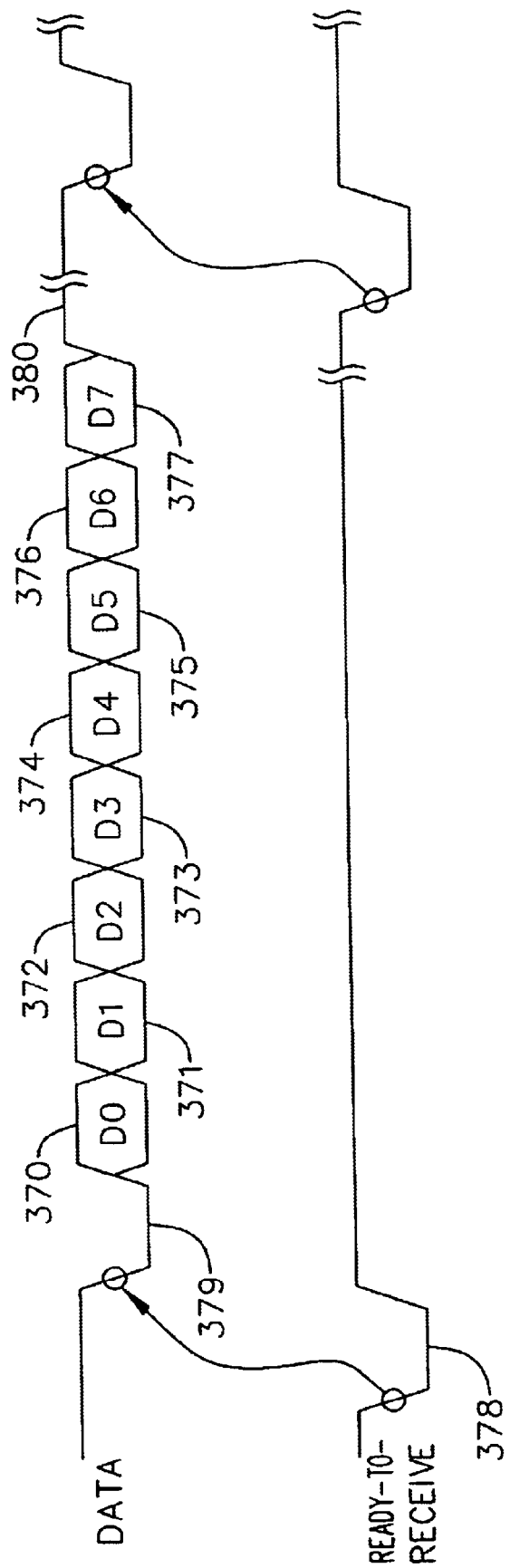
FIG. 3C illustrates, in a timing diagram, the input and output signals from a host interface of FIG. 3B in accordance with one embodiment of the invention.
Figure 6A:
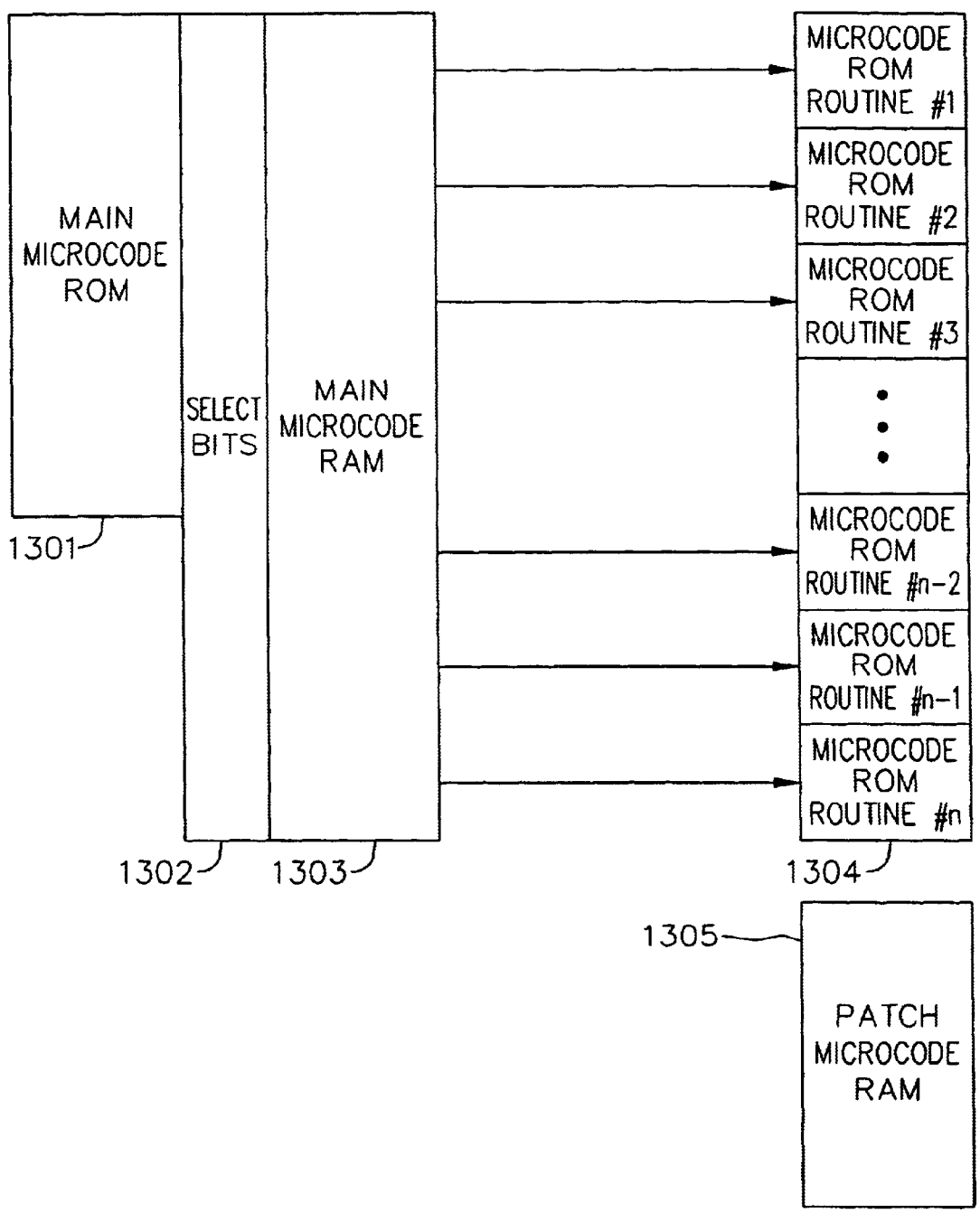
Figure 6B:
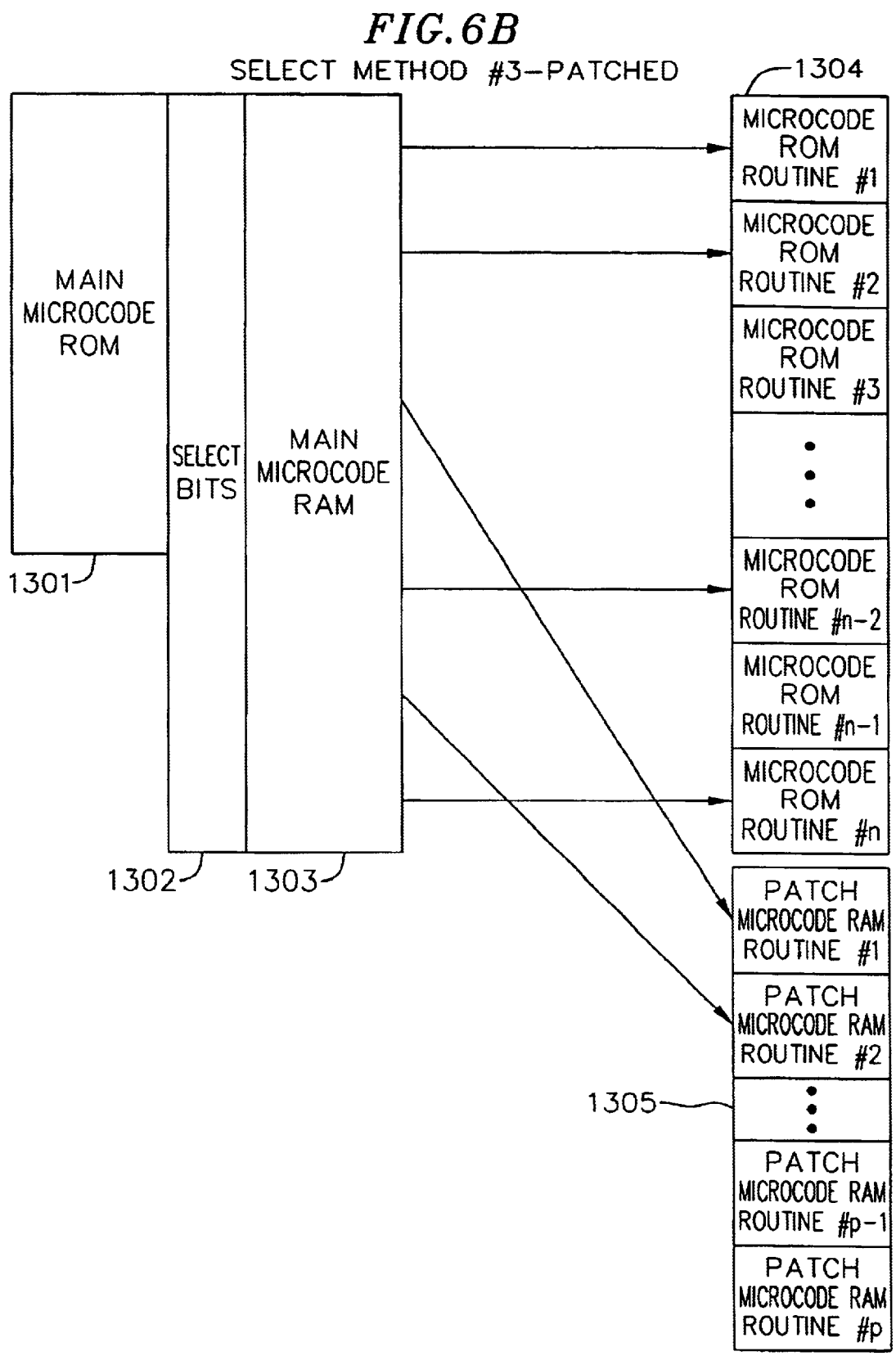
Figure 9:
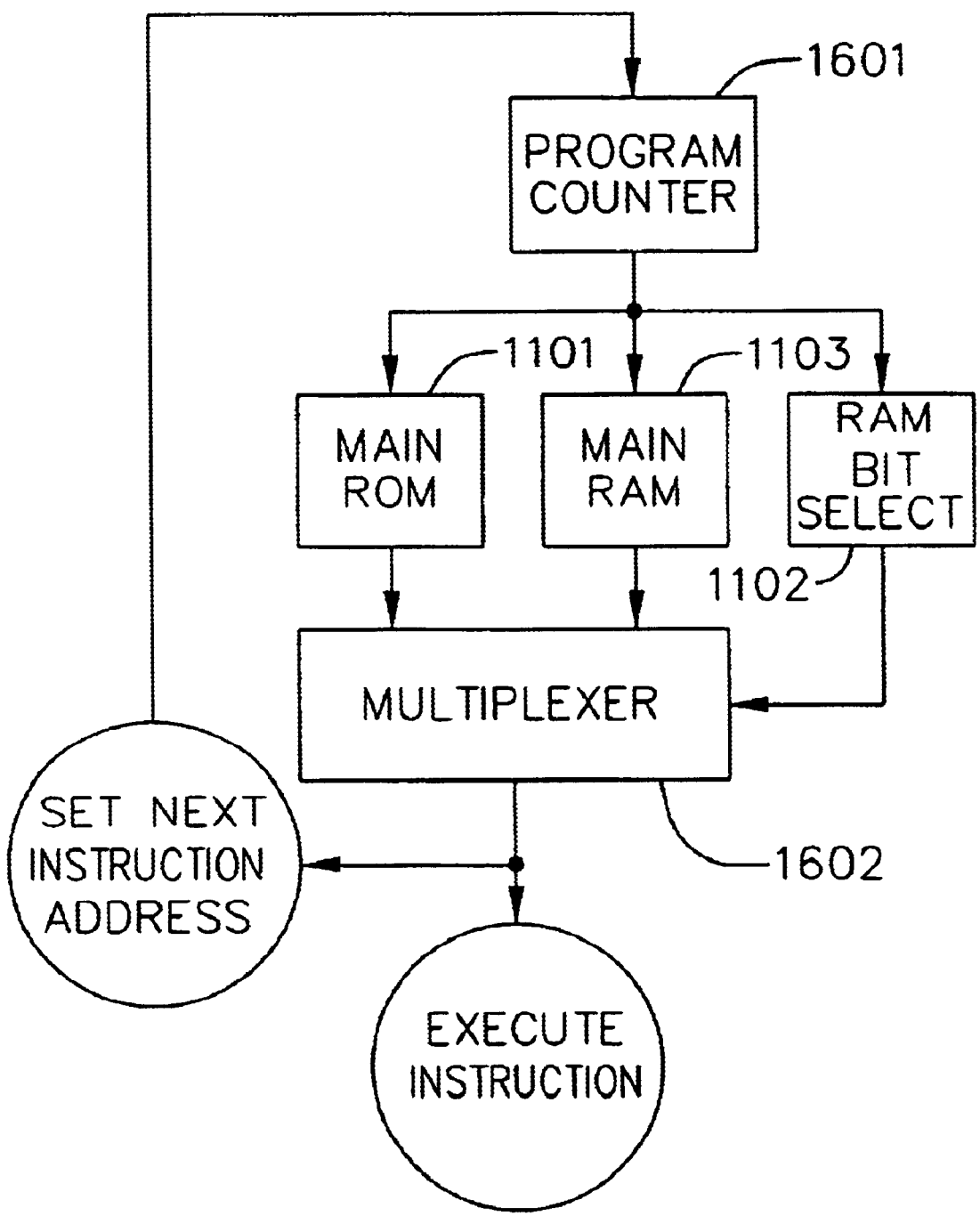
FIG. 9 is a block diagram showing the functional implementation of the memory architecture illustrated in FIG. 4.

FIGS. 6A through 6C illustrate one embodiment in which a portion of system RAM is used to store the address location for each ROM microcode routine or instruction. The addresses are loaded into RAM when the system is initialized on startup, or when a patch to system ROM microcode is received. FIG. 9 is a logic flowchart for a software routine to load the subject addresses into RAM. When a microcode routine or instruction is to be executed, the system is directed to obtain the microcode address from RAM. As shown in FIG. 3A, if there has been no change or addition to the microcode, the system will be directed to a ROM address, whereupon it will execute the routine or instruction stored in ROM. As illustrated in FIG. 3B, if a patch has been received and loaded in the patch RAM, the applicable RAM address will be substituted for the corresponding ROM instruction address and the routine executed in order from the patch RAM.

FIG. 9 illustrates a system for implementing the memory architecture shown in FIG. 4. To execute a microcode instruction, the program counter (1601) simultaneously addresses main ROM (1101), main RAM (1103), and a RAM select bit (1102). The ROM (1101) microcode and RAM (1103) microcode held in the selected address are input to a multiplexer (1602). The RAM select bit (1102) is used by the multiplexer to control the selection of ROM microcode or RAM microcode as the output of the multiplexer. Depending upon the status of the select bit, the multiplexer selects either the ROM microcode or the RAM microcode for output and further processing. The microcode selected for output from the multiplexer is then executed and the program counter incremented or branched as necessary to initiate the next microcode instruction routine.

Figure 5:
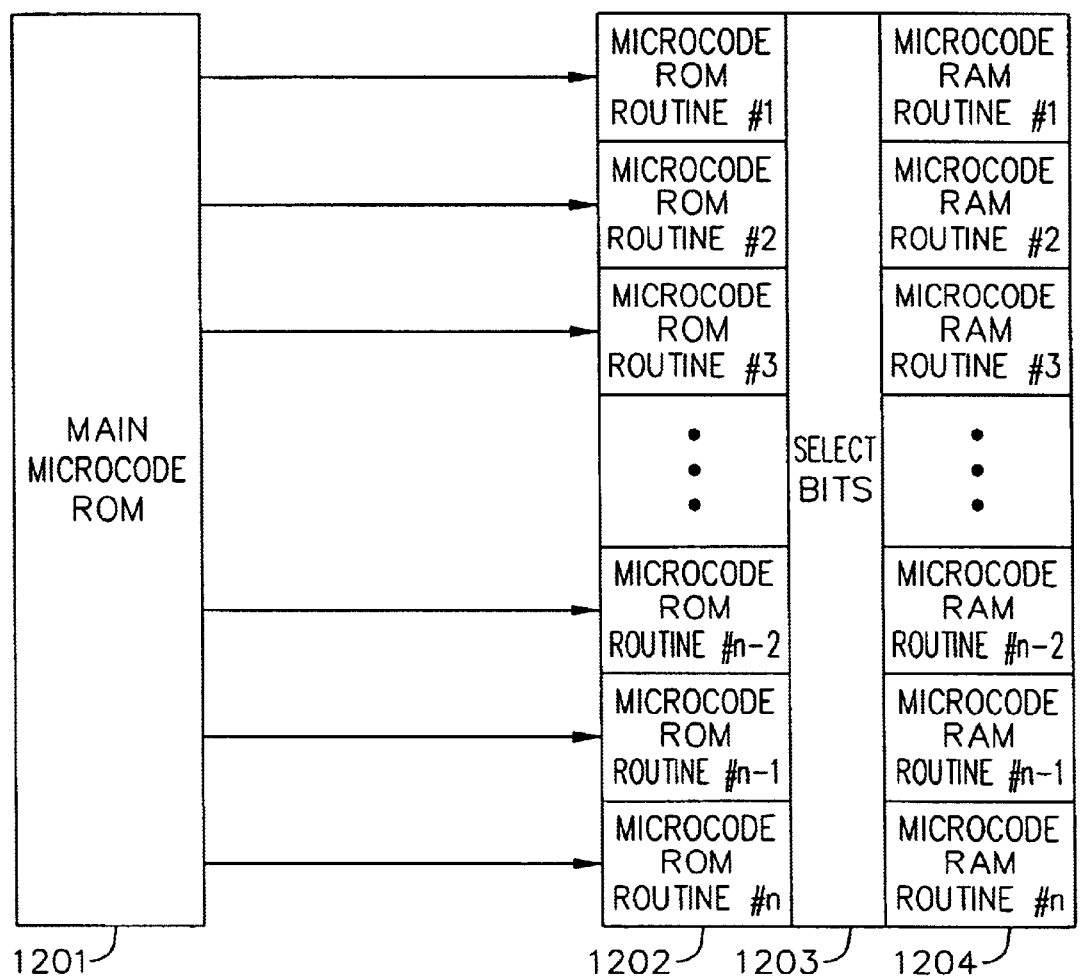
FIG. 5 illustrates a memory architecture in which main microcode ROM is mapped to a common memory address area shared by microcode ROM routines and corresponding microcode RAM routines, along with a "select" RAM bit used to control the selection of microcode ROM routines or microcode RAM routines.
Figure 10:
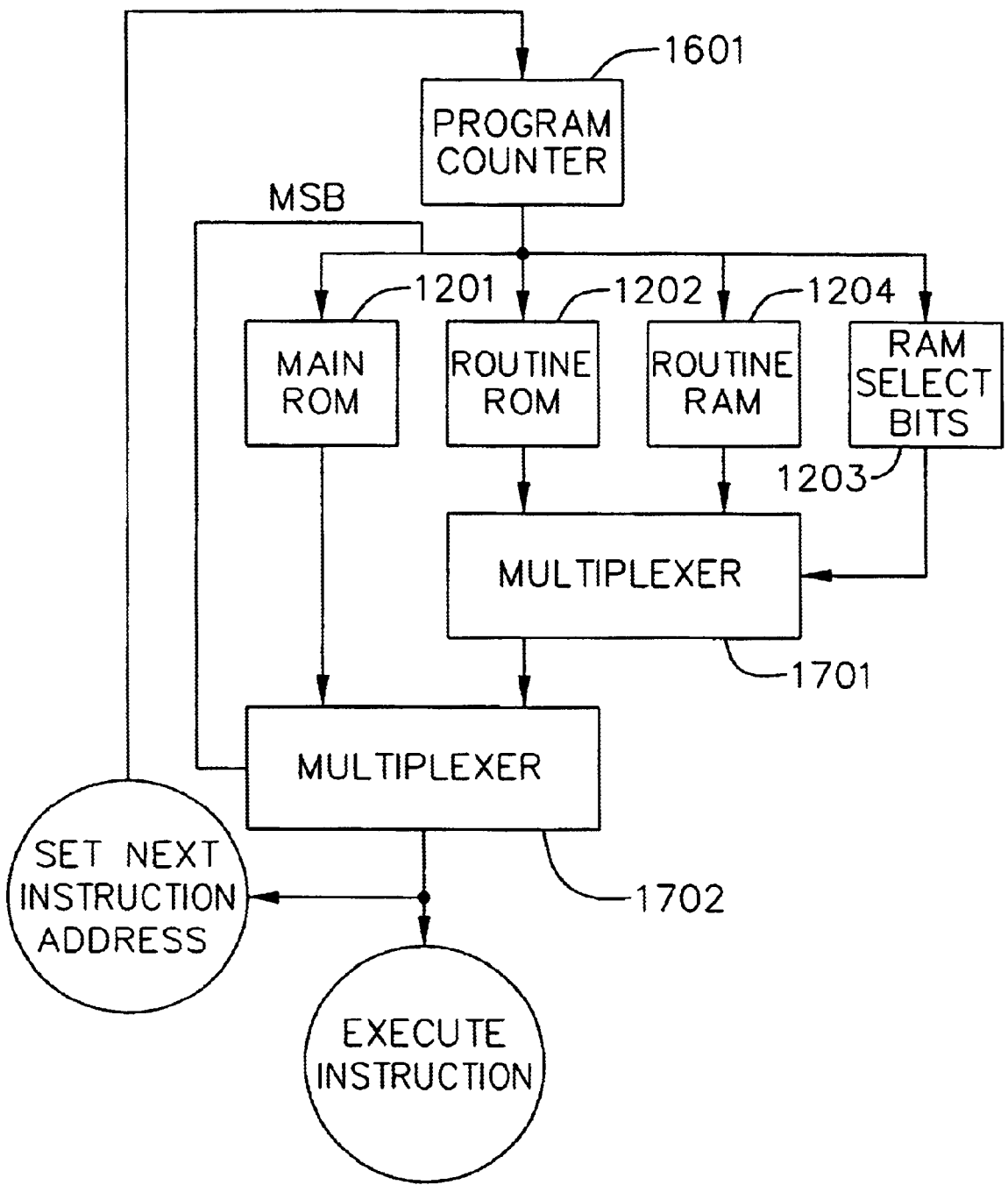
FIG. 10 is a block diagram showing the functional implementation of the memory architecture illustrated in FIG. 5.

FIG. 10 illustrates a system for implementing the memory architecture shown in FIG. 5. Here, the program counter (1601) simultaneously addresses main ROM (1201), routine ROM (1202), routine RAM (1204), and the RAM select bit (1203). The routine ROM (1202) and routine RAM (1204) microcode are input to a multiplexer (1701). The RAM select bit (1203) is used by the multiplexer to control the selection of routine ROM microcode or routine RAM microcode as the output of the multiplexer. Depending upon the status of the select bit, the multiplexer selects either the routine ROM microcode or the routine RAM microcode for output and further processing. The selected ouput from multiplexer 1701 is input to another multiplexer (1702). Main ROM microcode (1201) is also input to multiplexer 1702. The most significant bit (MSB) or other control bit from the program counter is used to select the output of multiplexer 1702. Depending upon the status of the MSB or other control bit, main ROM microcode or the output of multiplexer 1701 (routine ROM or routine RAM microcode) is selected for output and further processing. The microcode selected for output from multiplexer 1702 is then executed and the program counter incremented or branched as required to initiate the next microcode instruction.

Figure 11:
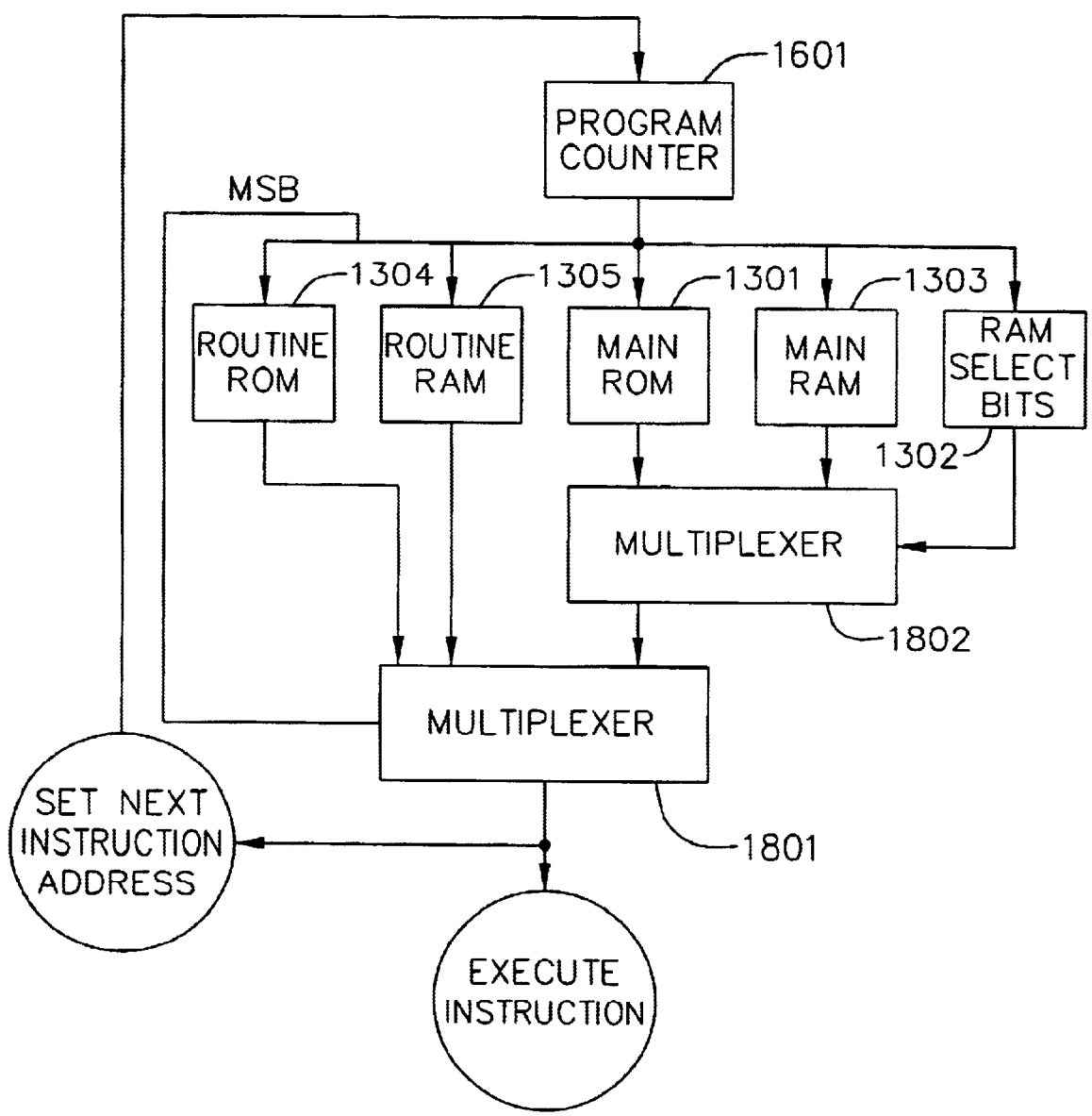
FIG. 11 is a block diagram showing the functional implementation of the memeory architecture illustraed in FIGS. 6A, 6B, and 6C.

FIG. 11 illustrates a system for implementing the memory architecture shown in FIGS. 6A, 6B, and 6C. In this case, the program counter (1601) simultaneously addresses main ROM (1301), main RAM (1303), routine ROM (1304), routine RAM (1305), and the RAM select bit (1302). The addressed main ROM microcode and main RAM microcode are used as inputs to multiplexer 1802. The RAM select bit (1302) is used to control the output of multiplexer 1802, either main ROM microcode or main RAM microcode. This output is then directed to multiplexer 1801. Routine ROM microcode (1304) and routine RAM microcode (1305) are also input to multiplexer 1801. The most significant bits (MSB) or other control bits from the program counter are used to select the output of multiplexer 1801. Depending upon the status of the MSBs or other control bits, routine ROM microcode, routine RAM microcode, or the output of multiplexer 1802 (main ROM or main RAM microcode) is selected for output and further processing. The microcode selected for output from multiplexer 1801 is then executed and the program counter incremented or branched as required to initiate the next microcode instruction.

Figure 7B:
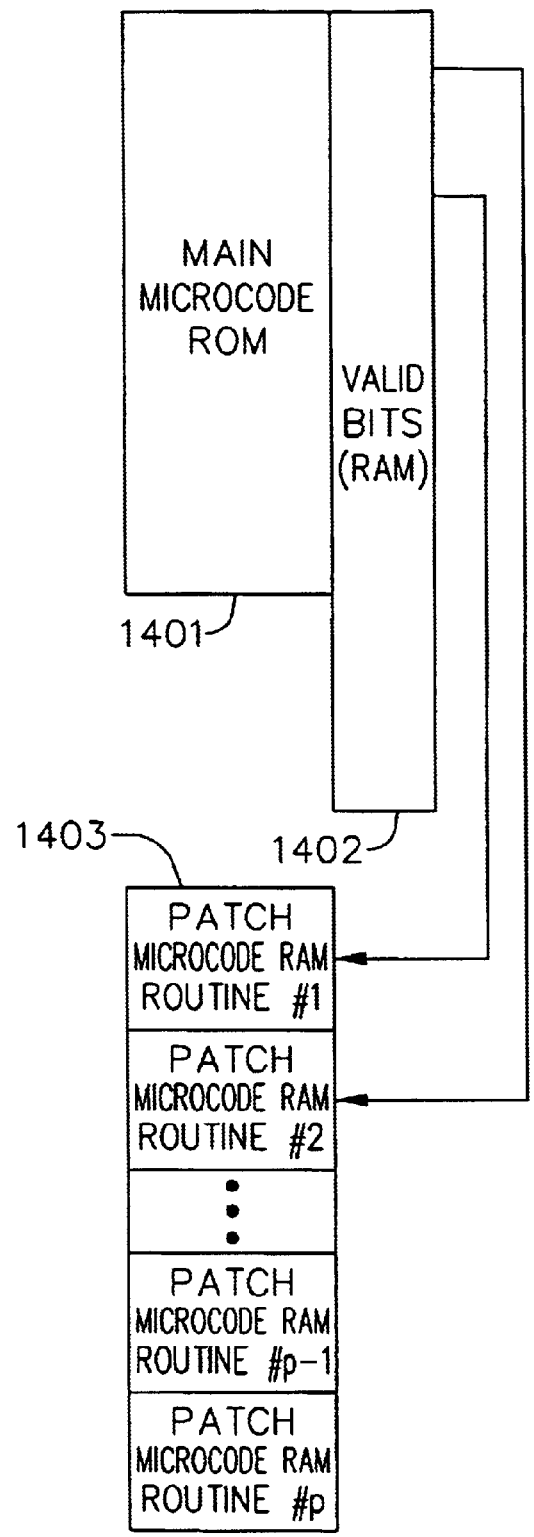
Figure 7C:
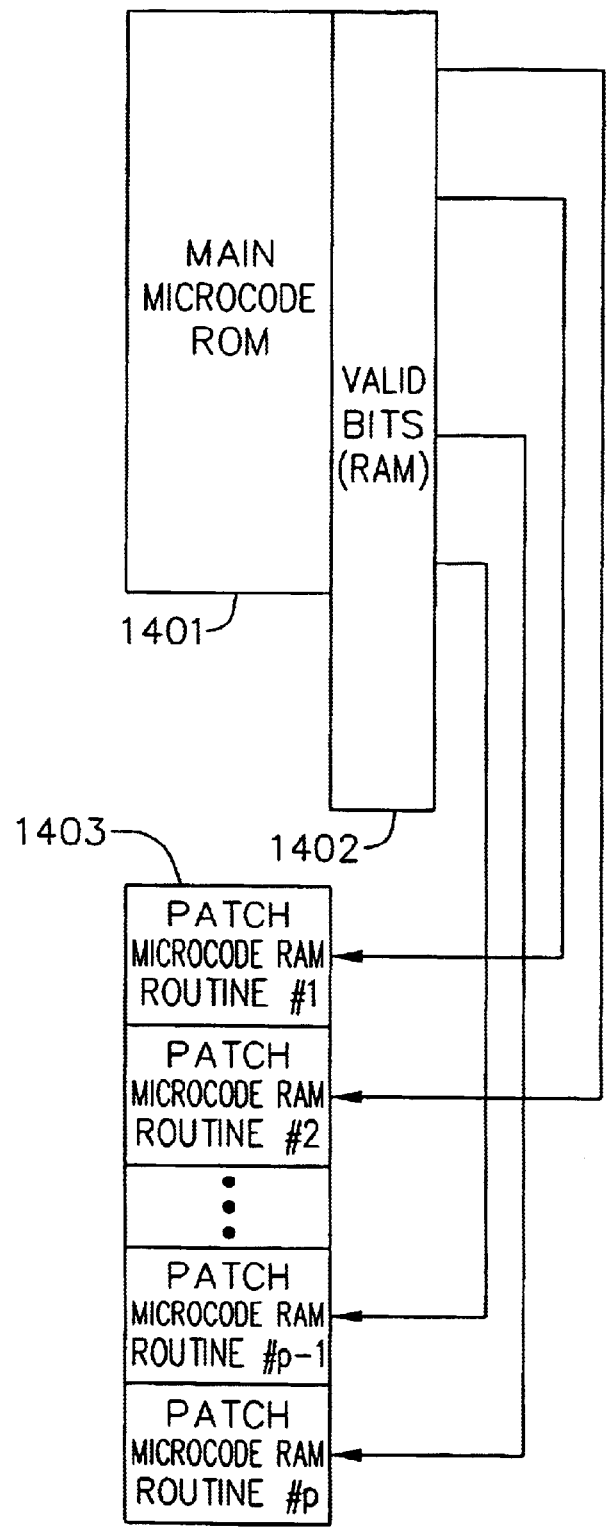
Figure 12:
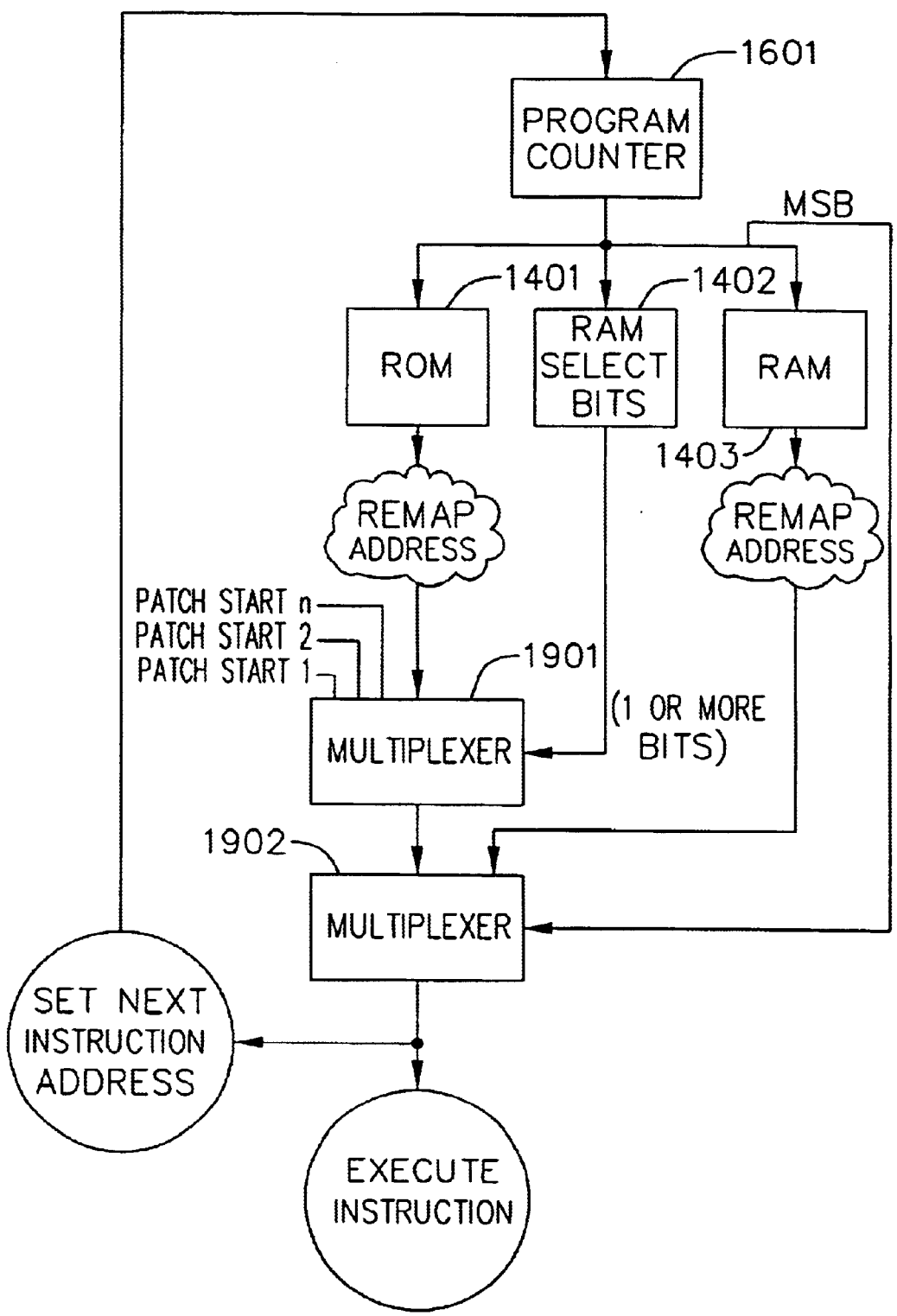
FIG. 12 is a block diagram showing the functional implementation of the memory architecture illustrated in FIGS. 7A, 7B, and 7C.

FIG. 12 illustrates a system for implementing the memory architecture shown in FIGS. 7A, 7B, and 7C. The program counter (1601) simultaneously addresses ROM (1401), RAM (1403), and the RAM select bit (1402). The ROM instruction is re-mapped by a logic circuit and then input to a multiplexer (1901) along with the available RAM patch routines. The routine to be selected is controlled by 1 or more RAM select bits (the number of bits determined by the number of potential patch routines). The selected routine is input to another multiplexer (1902), along with the re-mapped address of RAM instructions (1403). The selection from multiplexer 1902 is controlled by the most significant bit (MSB) of the program counter. The output instruction from multiplexer 1902 is executed and the address for the next instruction determined and forwarded to the program counter.

Figure 8A:
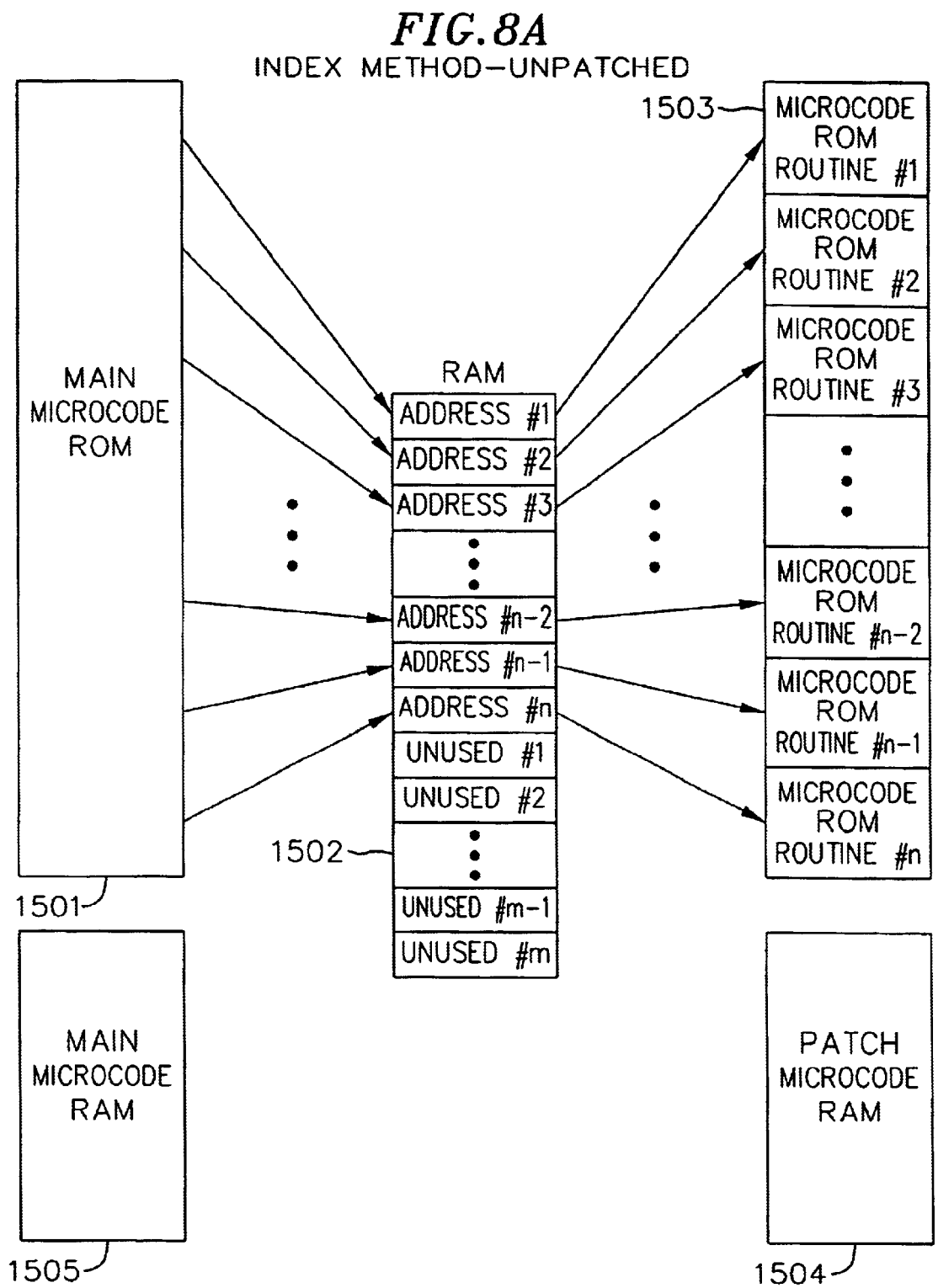
Figure 8B:
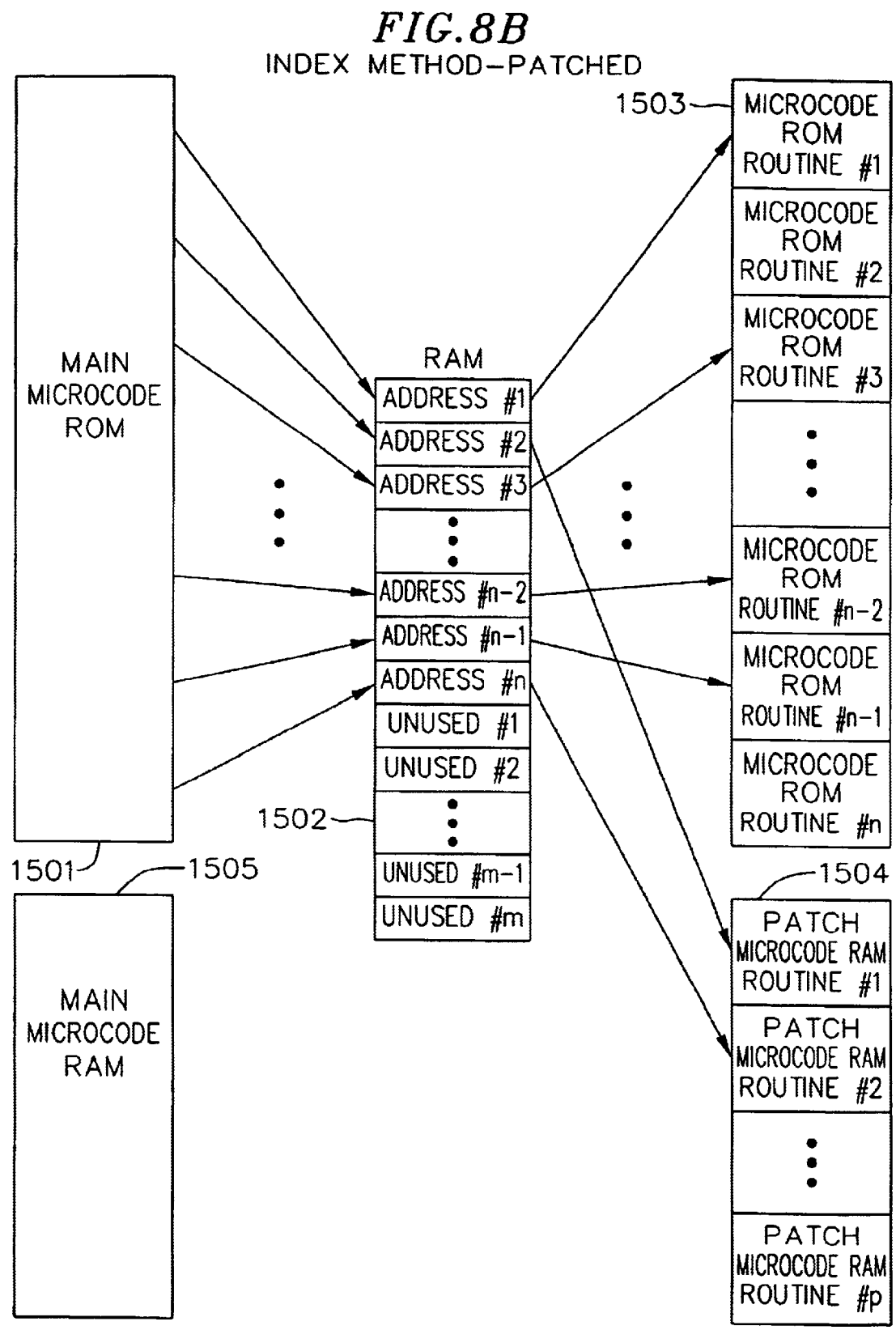
Figure 13:
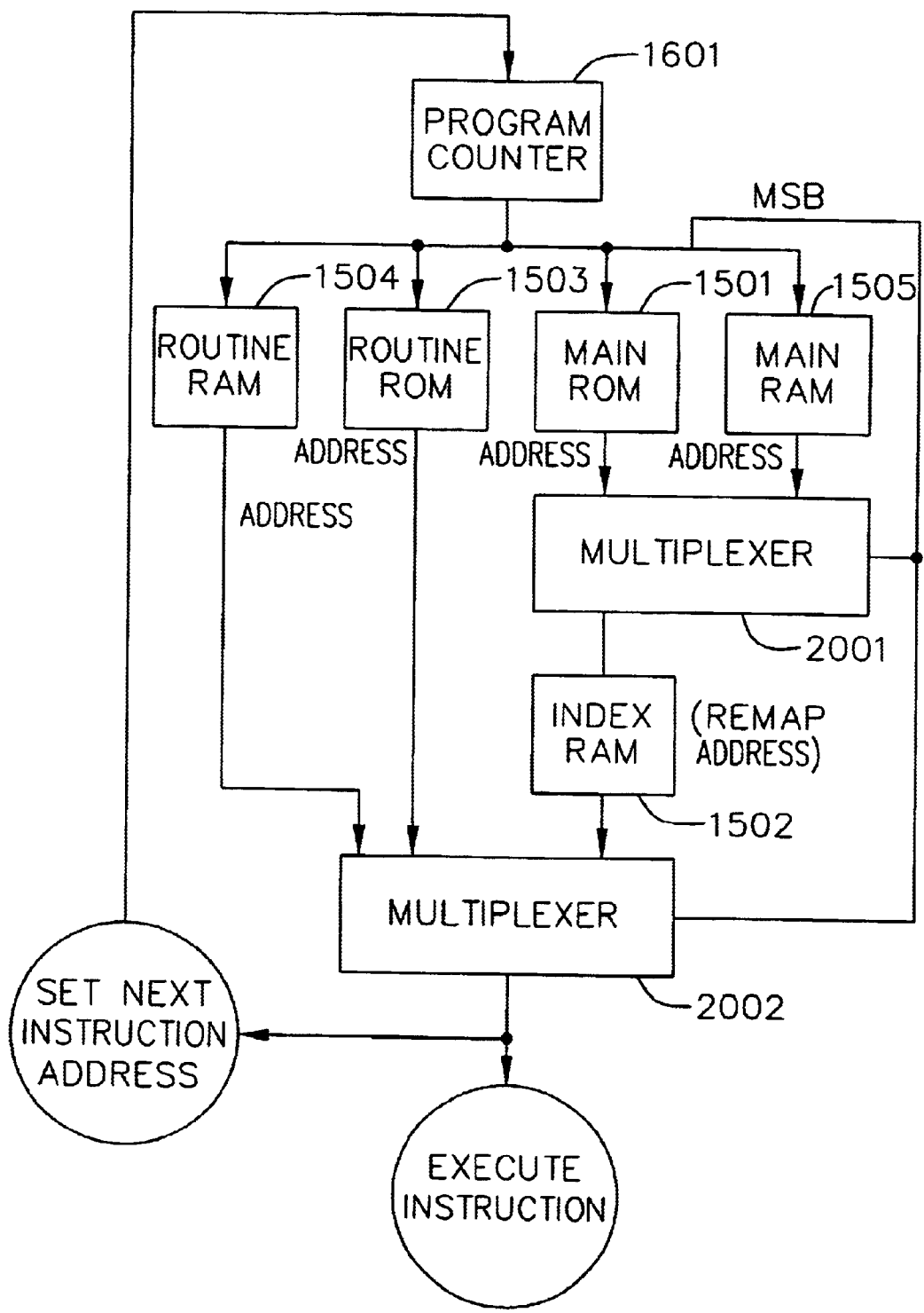
FIG. 13 is a block diagram showing the functional implementation of the memory architecture illustrated in FIGS. 8A, 8B, and 8C.

FIG. 13 illustrates a system for implementing the memory architecture shown in FIGS. 8A, 8B, and 8C. Program counter 1601 simultaneously addresses routine ROM (1503), main ROM (1501), main RAM (1505), and routine RAM (1504). The main RAM and main ROM microcode are used as inputs to multiplexer 2001. The most significant bits (MSB) or other control bits from the program counter are used to select the output of multiplexer 2001. Depending upon the status of the MSBs or other control bits, main ROM microcode or main RAM microcode is selected for output from multiplexer 2001. The selected address is then referenced to the index RAM (1502), remapped as necessary and input to multiplexer 2002. Routine ROM microcode and routine RAM microcode are input to multiplexer 2002. Again, the most significant bit (MSB) or other control bit from the program counter is used to select the output of multiplexer 2002. Depending upon the status of the MSB or other control bit, routine ROM microcode, routine RAM microcode, remapped main RAM or remapped main ROM is selected for output and further processing.

Figure 14:
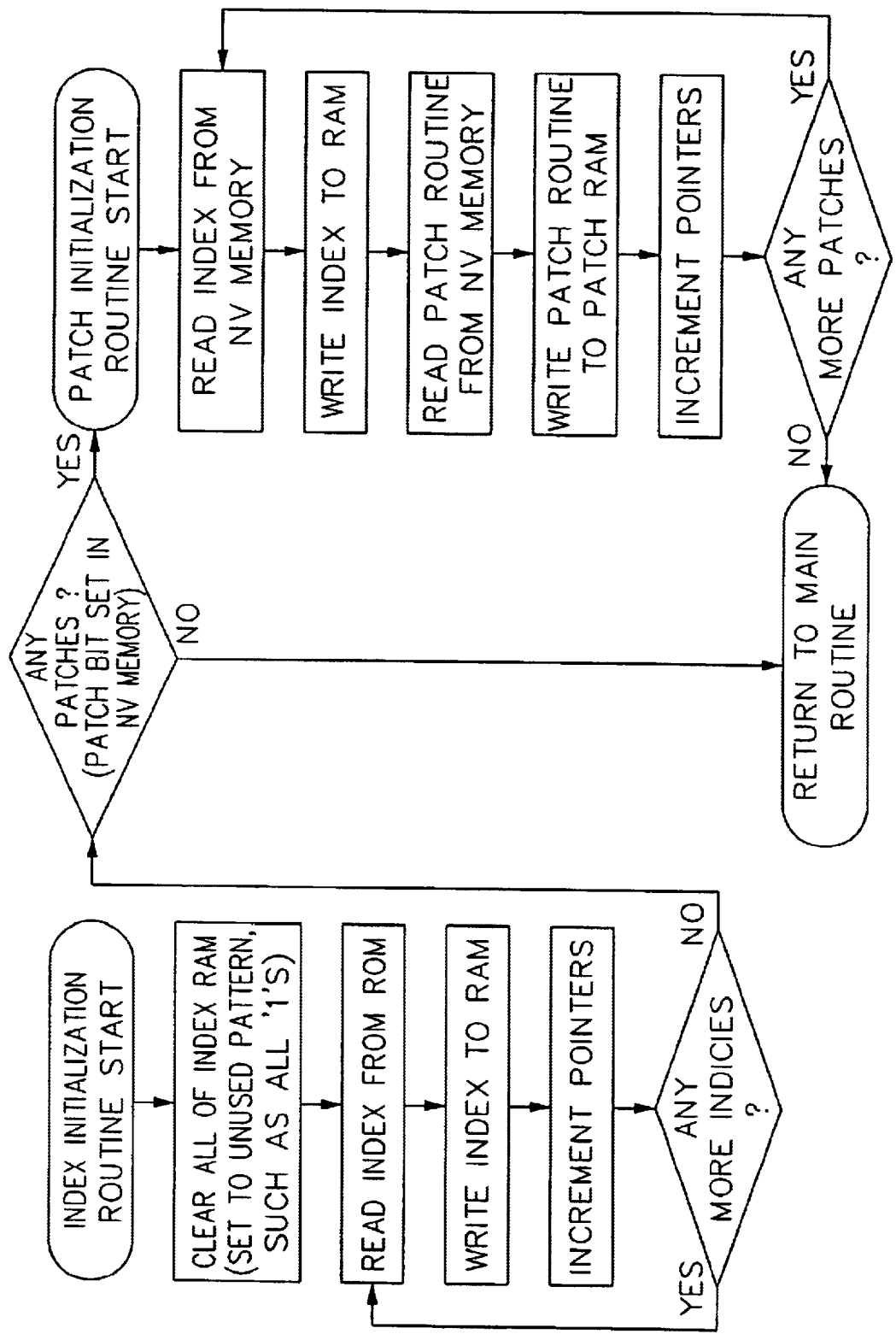
FIG. 14 is a programming flow chart showing a microcode patch initialization routine.

FIG. 14 is a programming flow chart showing a microcode patch initialization routine for the memory architecture depicted in FIGS. 8A, 8B, and 8C. After program initialization, all index RAM locations are set to the unused pattern (such as all "1s"). An index is read from ROM and written to RAM, and pointer incremented to show the next index location. The process is repeated until all indexes are initialized in order. Once the indexes are initialized, the presence of a microcode patch is queried from non-volatile memory by, for example, sampling the status of a designated "patch" bit. If a patch is detected, its index is read from non-volatile memory and written to the corresponding RAM index location. The patch routine is then read from non-volatile memory and written to the designated patch RAM area of memory. The process is repeated until all patches have been indexed and written to RAM. Those skilled in the art will understand that this is only one of many possible programs for loading patched microcode into RAM and indexing its location(s).

As one skilled in the art understands, data processing circuit 302 described above may further comprise a context switching circuit described in U.S. patent application Ser. No. 09/592,009, entitled "Context Switch Architecture and System," filed Jun. 12, 2000, hereinafter incorporated by reference in its entirety.

APPENDIX A

```
//****************************************************************
***
// RCS HEADER - - DO NOT ERASE
// $Author: john1 $
// $Id: demod.v,v 1.12 2000/05/30 20:59:21 john1 Exp john1 $
// Pivotal Technologies
//****************************************************************
***
`define SPB 32
`define CTR S
`define THR 10      // `THR defines the precision
`define TRK 2       // `TRK defines tracking speed
`define LIN 1
`define PREC 10
module demod(reset,clk,start,ip,qp,nrz,sclk);
input reset,clk;         // this is 32 MHz clock
input ip,qp; // from RF
input start;             // slot start indication from bluetooth clock
output nrz;  // extracted bit to elasticity buffer
output sclk; // write pulse to elasticity buffer
wire sample, cross;
wire dec;    // decision
reg prev_dec;
// the magic formula for arc tan
reg ip_reg, qp_reg;
reg [0:`SPB –1] i_buffer, q_buffer;
always @(posedge clk or posedge reset)
    begin
    if (reset | start)
        begin
        ip_reg <= 1`b0;
        qp_reg <= 1`b0;
        i_buffer <= `SPB'd0:
        q_buffer <= `SPB'd0;
        end
    else
        begin
        ip_reg <= ip;
        qp_reg <= qp;
```

APPENDIX A-continued

```
            i_buffer <= {ip_reg, i_buffer[0:`SPB -2]};
            q_buffer <= {qp_reg, q_buffer[0:`SPB -2]};
         end
      end
// for iq or qi, 1 is 1, 0 is -1
wire iq = ~(i_buffer[`SPB -1]^qp_reg);    // i(t-T)*q(t)
wire qi = ~(q_buffer[`SPB -1]^ip_reg);    // q(t-T)*i(t)
wire [`CTR +1:0] y2_big;   // range from -32 to 32, the integration
result of s_demod2
//running_avg_filter ifilter (
butterworth_filter ifilter(
         .reset(reset),
         .clk(clk),
         .iq(iq),
         .qi(qi),
         .start(start),
         .y2_big(y2_big)
);
// dc tracking
reg [(`THR + `CTR +1:0] th_max; wire [`CTR +1:0] th_max2 = th_max
[`THR + `CTR +1:`THR];
reg (`THR + `CTR +1:0] th_min; wire [`CTR +1:0] th_min2 = th_min
[`THR + `CTR +1:`THR];
wire [`THR + `CTR +2:0] thresholdx2 = { th_max[`THR + `CTR +1],
th_max } +
                                     { th_min[`THR + `CTR +1],
th_min };
wire [`THR + `CTR +1:0] threshold = thresholdx2 [`THR + `CTR +2:1];
wire [`CTR +1:0] thres2 = threshold[`THR + `CTR +1:`THR];
wire [3 + `THR + `CTR +1:0] threshold_div8 = { {3{threshold[`THR
+ `CTR +1]}}, threshold[`THR + `CTR +1:0] };
wire [3 + `THR + `CTR +1:0] y2_big_div8     = { {3{y2_big[`CTR +1]}},
y2_big[`CTR +1:0], `THR'd0 };
wire [`TRK + `THR + `CTR +1:0] y2_big_divved   = {
{`TRK{y2_big[`CTR +1]}}, y2_big[`CTR +1:0], `THR'd0 };
wire [`TRK + `THR + `CTR +1:0] th_max_divved   = {
{`TRK{th_max(`THR + `CTR +1]}}, th_max[`THR + `CTR +1:0]};
wire [`TRK + `THR + `CTR +1:0] th_min_divved   = {
{`TRK{th_min[`THR + `CTR +1]}}, th_min[`THR + `CTR +1:0]};
wire [`CTR +1:0] linear_max = thres2 + `LIN;
wire [`CTR +1:0] linear_min = thres2 - `LIN;
// baud tracking
// clipped at 1/8 (32 * 2 / 8 = 8)
wire [`CTR +2:0] delta = {y2_big[`CTR +1], y2_big} - {thres2[`CTR
+1], thres2};
wire [`CTR +1:0] clipped_delta = (delta <= 4)                  ?
delta :
                              (delta < {1'b1,1'b0, `CTR'd0}) ? 4
:
                              (delta < -4)                  ? -4   :
                                                              delta;
reg [4:0] start_counter;
always @(posedge reset or posedge clk)
   begin
      if (reset)
         begin
            start_counter = 5'd0;
            th_max = {2'd0, `CTR'd0, `THR'd0}:
            th_min = {2'd0, `CTR'd0, `THR'd0};
         end
      else if (start)
         begin
            start_counter = 5'h1F;
            th_max = {2'd0, `CTR'd0, `THR'd0};
            th_min = {2'd0, `CTR'd0, `THR'd0};
         end
      else if (sample)   // start of packet, adjusting to carrier
         begin
            if (start_counter > 0)
               begin
                  start_counter = start_counter -1;
                  th_min = th_min - threshold_div8[3 + `THR + `CTR +1:3];
                  th_min = th_min +    y2_big_div8[3 +`THR + `CTR +1:3];
                  th_max = th_min;
                                     //    { {3{y2_big[`CTR +1]}},
y2_big[`CTR +1:0], 3'd0};
                                     //+ ~{ {3{threshold[`THR + `CTR +1]}},
threshold[`THR + `CTR +1:`THR_3]} + 1;
               end
```

APPENDIX A-continued

```
            else if ( dec && !prev_dec)     // steady state
                begin
                    th_max = th_max - th_max_divved[`TRK + `THR + `CTR +1:
                    `TRK];
                    th_max = th_max + y2_big_divved[`TRK + `THR + `CTR +1: `TRK];
                end
            else if (!dec && prev_dec)
                begin
                    th_min = th_min - th_min_divved[`TRK + `THR + `CTR +1: `TRK];
                    th_min = th_min + y2_big_divved[`TRK + `THR + `CTR +1: `TRK];
                end
        end
    end
// decision
wire raw_dec = ~delta[`CTR +2];
wire [`CTR +2:0] overlinear  = `LIN - delta;
wire [`CTR +2:0] underlinear = delta + `LIN;
wire in_linear = raw_dec ? ~overlinear[`CTR +2] :
~underlinear[`CTR +2];
//wire in_linear = 1'b0;
assign dec = in_linear ? ~prev_dec : raw_dec;
// phase adjustment
// maximum adjustment is 16, minimum adjustment is 0.5
// crossing value of 1 cause adjustment of 0.5
// crossing value of >=32 cause adjustment of 16
reg [`CTR +1:0] phase;            // can be more than 32 later, depend on
adjustment
                                  // phase [0] is below decimal
reg [`CTR +1:0] crossing_value;  // [-32 ,32]
wire [`CTR +1:0] adjustment =
                      (prev_dec == dec)   ? {2'd0, `CTR'd0} :  // flat
                      (prev_dec == 1'b1) ? crossing_value :  // downward
                                           ~crossing_value + 1;  // upward
assign sample = (phase[`CTR +1:1] == 0)   ? 1'b1 : 1'b0;
assign cross  = (phase[`CTR +1:1] == 16) ? 1'b1 : 1'b0;
// phase update and adjustment
always @(posedge clk or posedge reset)
    begin
    if (reset)
        begin
        phase = {1'b0, ~{`CTR'd0}, 1'b0};   // default 31.0
        prev_dec = 1'b0;
        end
    else if (sample)
        begin
        phase = {1'b0, ~{`CTR'd0}, phase[0]};   // keep the fraction
        phase = phase + adjustment;
        prev_dec = dec;
        end
    else
        phase[`CTR +1:1] = phase[`CTR +1:1] -1;
    end
always @(posedge clk or posedge reset)
    begin
    if (reset)
        crossing_value <= {2'd0, `CTR'd0};
    else if (cross)
        crossing_value <= clipped_delta;
    end
wire baud = dec;
wire valid = sample;
reg nrz;
reg [4:0] sclk_counter;
always @(posedge clk or posedge reset)
    begin
    if (reset)
        begin
        nrz <= 1'b0;
        sclk_counter <= 5'd0;
        end
    else if (valid)
        begin
        nrz <= baud;
        sclk_counter <= 5'd0;
        end
    else if (sclk_counter < 31)
        sclk_counter <= sclk_counter + 1;
    else;
    end
```

APPENDIX A-continued

```
assign sclk = sclk_counter[4];
endmodule
// running average of demod, y2_big
module running_avg_filter(reset,clk,iq,qi,y2_big, start);
input reset, clk, iq,qi;
input start;
output [`CTR +1:0] y2_big;   // range from -32 to 32, the
integration result of s_demod2
// only allow 00, 01, 10. 11 is the same as 00
wire [0:1] S_demod2 = {iq,qi};
reg [0:`SPB -1] y2_i, y2_q;
always @(posedge clk or posedge reset)
    begin
    if (reset | start)
        begin
        y2_i <= `SPB'd0;
        y2_q <= `SPB'd0;
        end
    else
        begin
        y2_i <= {s_demod2[0],y2_i[0:`SPB -2]};
        y2_q <= {s_demod2[1],y2_q[0:`SPB -2]};
        end
    end
reg [`CTR +1:0] y2_big;  // range from -32 to 32, the integration
result of s_demod2
always @(posedge clk or posedge reset)
    begin
    if (reset | start)
        y2_big = {2'd0, `CTR'd0};
    else
        begin
        if (y2_i[31])
            y2_big = y2_big -1;         // remove a +1
        if (y2_q[31])
            y2_big = y2_big +1;         // remove a -1
        if (s_demod2[0])
            y2_big = y2_big +1;         // add a +1
        if (s_demod2[1])
            y2_big = y2_big -1;         // add a -1
        end
    end
endmodule
module butterworth_filter(reset,clk, iq,qi,y2_big,start);
input start;
input reset, clk;
input iq;   // add a +1
input qi;   // add a -1
output [`CTR +1:0] y2_big;
// this implements:
//   y(n) = x(n) + 2*x(n-1) + x(n-2) - ( -1.8613*y(n-1) +
0.8691*y(n-2) )
// where y = BX - AY
// x input delay chain
reg [1:2] iqt, qit;
always @(posedge reset or posedge clk)
    begin
    if (reset)
        begin
        iqt <= 2'd0;
        qit <= 2'd0;
        end
    else
        begin
        iqt <= {iq,iqt[i]};
        qit <= {qi,qit[i]};
        end
    end
// sum up the BX
reg [3:0] bx;
always @(iq or qi or iqt or qit)
    begin
    bx = 0;
    if (iq) bx = bx + 1;
    if (qi) bx = bx - 1;
    if (iqt[i]) bx = bx + 2;
    if (qit[i]) bx = bx - 2;
```

APPENDIX A-continued

```
        if (iqt[2]) bx = bx + 1;
        if (qit[2]) bx = bx - 1;
        end
reg  [`PREC + 9:0] y1,y2;
// sos5 = -1906/1024,
// sos6 =   890/1024
// product of y1 & sos5
wire [11 + `PREC + 9 :0] signed_y1 = { {11{y1[`PREC +9]}}, y1};
wire [22 + `PREC + `PREC + 19 :0] product_y1_sos5 = signed_y1 *
1906;
wire [11 + `PREC + 9 :0] y1_sos5_1k = product_y1_sos5;  // still
need to divide by 1024
wire [`PREC + 10:0] y1_sos5 = y1_sos5_1k[11 + `PREC + 9 :10];
// product of y2 & sos6
wire [11 + `PREC + 9 :0] signed_y2 = { {11{y2[`PREC + 9]}}, y2};
wire [22 + `PREC + `PREC + 19 :0) product_y2_sos6 = signed_y2 *
890;
wire [11 + `PREC + 9 :0] y2_sos6_1k = product_y2_sos6;  // still
need to divide by 1024
wire [`PREC + 10:0] y2_sos6 = y2_sos6_1k[11 + `PREC + 9 :10];
// sum up AY
wire [`PREC + 11:0] ay = {y2_sos6[`PREC +10],y2_sos6} -
{y1_sos5 [`PREC +10], y1_sos5};
// y = BX - AY
wire [`PREC + 12:0] ext_y = {{19{bx[3]}},bx} - {ay[`PREC +11],ay};
wire [`PREC + 9:0] y = {ext_y[`PREC +12], ext_y[`PREC + 8:0]};
always @(posedqe reset or posedge clk)
    if (reset || start)
        begin
        y1 <= 0;
        y2 <= 0;
        end
    else
        begin
        y1 <= y;
        y2 <= y1;
        end
assign y2_big = y1[10: 10 - `CTR -1];
endmodule
```

APPENDIX B

```
#include <assert.h>
#include <iostream.h>
#include <math.h>
#include <stdlib.h>
#include <stdio.h>
#include <list>
#include <sys/time.h>
#include "util.h"
#include "rx_simple.h"
#include "rx_ma.h"
#include "rx_hma.h"
#include "rx_el1.hr"
#include "rx_el1a.h"
#include "rx_el1b.h"
#define CONST const
double ebn0=25.0;              /* dB */
CONST int nbits=1000000;       /* number of bits to produce */
CONST double pc=1.0;           /* carrier power, Watts */
CONST double fif=1.0e6;        /* intermediate frequency */
double foff=1*150e3;           /* static frequency offset */
CONST double fs=16e6;          /* sampling rate */
double fdev=140e3;             /* fm deviation, 140-175 kHz */
CONST double fbit=1e6;         /* data rate */
double tbit;                   /* baud interval */
int spb;                       /* samples per bit */
CONST double btbit=0.5;        /* gfsk duration-bw product */
double b;                      /* gaussian filter bandwidth */
double fmaxdrift=1*0.5*40e3;   /* maximum drift amplitude */
CONST double fdriftrate=400e6; /* maximum drift rate,
400 HZ/us */
CONST double trefractory=10e-6; /* refractory period
between chirps */
double tdrift;                 /* chirp waveform period */
double fdrift;                 /* chirp waveform frequency */
double adrift;                 /* chirp waveform "amplitude"
(Hz) */
CONST int skipbits=100;        /* initial bits to skip */
CONST int flushbits=10;        /* final bits for flushing
filters */
CONST int syncbits=4;          /* alternating bits after
carrier */
CONST int carrierbits=4;       /* length of pure carrier in
bits */
CONST double cphase0=0.0;      /* initial carrier phase,
(2*PI) */
double cphase;
double dcphase;
double mphase;                 /* message integral */
double mphase_scale;           /* scales message to radians
*/
double chirpfphase;            /* chirp frequency nco phase
(rad) */
double dchirpfphase;
double chirpphase;             /* (2*PI) */
double chirpphase_scale;
double ampscale;
double noisescale;
int ip_z=0;
int qp_z=0;
int det_z=0;
int det_zz=0;
double stage1_z=0;
double stage1_zz=0;
```

APPENDIX B-continued

```
double stage2_z=0;
double stage2_zz=0;
//long randseed=954924254;    // el1a fails bigtime
long randseed=955132310;      // el1a fails
//long randseed=0;
bitbuffer truebits;
list<rxinfo> rxlist;
/*
        initialize
        set up simulation globals
*/
void initialize(void)  {
    if (randseed==0)  {
        struct timeval tv;
        gettimeofday(&tv, NULL);
        randseed=tv.tv_sec^tv.tv_usec;
    }
    cout << "seed: " << randseed << end1 ;
    srand48 (randseed);
    srand(randseed);
    tbit=1.0/fbit;
    b=btbit/tbit;
    spb=(int)floor(fs/fbit);       /* MUST BE INTEGER */
    tdrift=4*fmaxdrift/fdriftrate+2*trefractory;
    fdrift=1.0/tdrift;
    adrift=fmaxdrift+fdriftrate*trefractory/2.0;
    cphase = 2*PI*( cphase0<0.0 ? drand48() : cphase0 ) ;
    dcphase = 2*PI*(fif+foff)/fs ;
    mphase=0.0;
    mphase_scale=2*PI*fdev/fs;
    chirpfphase=0.0;
    dchirpfphase=2*PI*fdrift/fs;
    chirpphase=0.0;
    chirpphase_scale=2*PI/fs;
#if 0
    ampscale=sqrt(pc);
    noisescale=sqrt(pow(10.0, -ebno/10.0)*pc*tbit*fs/2.0);
#else
    ampscale=1.0;
    noisescale=0.1590541458;
#endif
    printf("noisescale %.10g\n", noisescale);
    //register_rx(rxlist, new rx_simple(16, 0), "RX0");
    //register_rx(rxlist, new rx_simple(16, 1), "RX1");
    //register_rx(rxlist, new rx_simple(16, 2), "RX2");
    //register_rx(rxlist, new rx_simple(16, 3), "RX3");
    //register_rx(rxlist, new rx_simple(16, 4), "RX4");
    //register_rx(rxlist, new rx_simple(16, 5), "RX5");
    register_rx(rxlist, new rx_simple(16, 6), "RX6");
    register_rx(rxlist, new rx_simple(16, 7), "RX7");
    register_rx(rxlist, new rx_simple(16, 8), "RX8");
    //register_rx(rxlist, new rx_simple(16, 9), "RX9");
    //register_rx(rxlist, new rx_simple(16, 10), "RX10");
    //register_rx(rxlist, new rx_simple(16, 11), "RX11");
    //register_rx(rxlist, new rx_simple(16, 12), "RX12");
    //register_rx(rxlist, new rx_simple(16, 13), "RX13");
    //register_rx(rxlist, new rx_simple(16, 14), "RX14");
    //register_rx(rxlist, new rx_simple(16, 15), "RX15");
    register_rx(rxlist, new rx_ma(16, 0), "MRX0");
    //register_rx(rxlist, new rx_ma(16, 1), "MRX1");
    //register_rx(rxlist, new rx_ma(16, 2), "MRX2");
    //register_rx(rxlist, new rx_ma(16, 3), "MRX3");
    //register_rx(rxlist, new rx_ma(16, 4), "MRX4");
    //register_rx(rxlist, new rx_ma(16, 5), "MRX5");
    //register_rx(rxlist, new rx_ma(16, 6), "MRX6");
    //register_rx(rxlist, new rx_ma(16, 7), "MRX7");
    //register_rx(rxlist, new rx_ma(16, 8), "MRX8");
    //register_rx(rxlist, new rx_ma(16, 9), "MRX9");
    //register_rx(rxlist, new rx_ma(16, 10), "MRX10");
    //register_rx(rxlist, new rx_ma(16, 11), "MRX11");
    //register_rx(rxlist, new rx_ma(16, 12), "MRX12");
    //register_rx(rxlist, new rx_ma(16, 13), "MRX13");
    register_rx(rxlist, new rx_ma(16, 14), "MRX14");
    register_rx(rxlist, new rx_ma(16, 15), "MRX15");
    register_rx(rxlist, new rx_hma(16, 0), "HMRX0");
    //register_rx(rxlist, new rx_hma(16, 1), "HMRX1");
    //register_rx(rxlist, new rx_hma(16, 2), "HMRX2");
    //register_rx(rxlist, new rx_hma(16, 3), "HMRX3");
    //register_rx(rxlist, new rx_hma(16, 4), "HMRX4");
    //register_rx(rxlist, new rx_hma(16, 5), "HMRX5");
    //register_rx(rxlist, new rx_hma(16, 6), "HMRX6");
    //register_rx(rxlist, new rx_hma(16, 7), "HMRX7");
    //register_rx(rxlist, new rx_hma(16, 8), "HMRX8");
    //register_rx(rxlist, new rx_hma(16, 9), "HMRX9");
    //register_rx(rxlist, new rx_hma(16, 10), "HMRX10");
    //register_rx(rxlist, new rx_hma(16, 11), "HMRX11");
    //register_rx(rxlist, new rx_hma(16, 12), "HMRX12");
    //register_rx(rxlist, new rx_hma(16, 13), "HMRX13");
    register_rx(rxlist, new rx_hma(16, 14), "HMRX14");
    register_rx(rxlist, new rx_hma(16, 15), "HMRX15");
    register_rx(rxlist, new rx_el1(16, 0), "EL1");
    register_rx(rxlist, new rx_el1a(16, 0, carrierbits*spb, 16, 2), "EL1A(16,2)");
    register_rx(rxlist, new rx_el1a(16, 0, carrierbits*spb, 16, 1.5), "EL1A(16,1.5)")
    register_rx(rxlist, new rx_el1a(16, 0, carrierbits*spb, 16, 1) "EL1A(16,1)");
    register_rx(rxlist, new rx_el1a(16, 0, carrierbits*spb, 8, 2), "EL1A(8,2)");
    register_rx(rxlist, new rx_el1a(16, 0, carrierbits*spb, 8, 1.5), "EL1A(8,1.5)");
    register_rx(rxlist, new rx el1a(16, 0, carrierbits*spb, 8, 1), "EL1A(8,1)");
    //register_rx(rxlist, new rx_el1b(16, 7, carrierbits*spb, 4, 1.5, "EL1B.dat"), "EL1B");
}
/*
        gfilter
        33-tap gaussian pulse shaping filter
*/
double gfilter(double x) {
    #define G16 (7.613857126244286e-05)
    #define G15 (1.803089206070547e-04)
    #define G14 (4.039001919005719e-04)
    #define G13 (8.558058698585730e-04)
    #define G12 (1.715223893126822e-03)
    #define G11 (3.251701939967811e-03)
    #define G10 (5.831026268138501e-03)
    #define G09 (9.890622382335143e-03)
    #define G08 (1.586889182891397e-02)
    #define G07 (2.408318S66948984e-02)
    #define G06 (3.457208908781445e-02)
    #define G05 (4.694417038746243e-02)
    #define G04 (6.029510682574100e-02)
    #define G03 (7.325323772539470e-02)
    #define G02 (8.418135970604142e-02)
    #define G01 (9.150596451859631e-02)
    #define G00 (9.408648097365654e-02)
    #define GFILTER_STATESIZE 1024
    static double state[GFILTER_STATESIZE] = {
        0.0, 0.0, 0.0, 0.0, 0.0, 0.0, 0.0, 0.0,
        0.0, 0.0, 0.0, 0.0, 0.0, 0.0, 0.0, 0.0,
        0.0, 0.0, 0.0, 0.0, 0.0, 0.0, 0.0, 0.0,
        0.0, 0.0, 0.0, 0.0, 0.0, 0.0, 0.0, 0.0,
        0.0, 0.0, 0.0, 0.0, 0.0, 0.0, 0.0, 0.0,
        0.0, 0.0, 0.0, 0.0, 0.0, 0.0, 0.0, 0.0,
        0.0, 0.0, 0.0, 0.0, 0.0, 0.0, 0.0, 0.0,
        0.0, 0.0, 0.0, 0.0, 0.0, 0.0, 0.0, 0.0
    } ;
    static int loc=32;
    state[loc]=x;
    double *right=&state[loc];
#if 0
    double accum;
    double *left=&state[loc-32];
    accum=G16*(*right--+*left++);
    accum+=G15*(*right--+*left++);
    accum+=G14*(*right--+*left++);
    accum+=G13*(*right--+*left++);
    accum+=G12*(*right--+*left++);
    accum+=G11*(*right--+*left++);
    accum+=G10*(*right--+*left++);
    accum+=G09*(*right--+*left++);
    accum+=G08*(*right--+*left++);
    accum+=G07*(*right--+*left++);
    accum+=G06*(*right--+*left++);
    accum+=G05*(*right--+*left++);
    accum+=G04*(*right--+*left++);
```

APPENDIX B-continued

```
        accum+=G03* (*right- - +*left+ +);
        accum+=G02* (*right- - +*left+ +);
        accum+=G01* (*right- - +*left+ +);
        accum+=G00**right;
#endif
#if 1
        double accum= G16*(right[0]+right[-32])+
                       G15* (right [-1]+right [-31]) +
                       G14* (right [-2]+right [-30]) +
                       G13* (right [-3]+right [-29]) +
                       G12* (right [-4]+right [-28]) +
                       G11* (right [-5]+right [-27]) +
                       G10* (right [-6]+right [-26]) +
                       G09* (right [-7]+right [-25]) +
                       G08* (right [-8]+right [-24]) +
                       G07* (right [-9]+right [-23]) +
                       G06* (right [-10]+right [-22]) +
                       G05* (right [-11]+right [-21]) +
                       G04* (right [-12]+right [-20]) +
                       G03* (right [-13]+right [-19]) +
                       G02* (right [-14]+right [-18]) +
                       G01* (right [-15]+right [-17]) +
                       G00* (right [-16]);
#endif
        if (++loc==GFILTER_STATESIZE)  {
               memcpy(&state[0], &state[GFILTER_STATESIZE-32],
32*sizeof(*state));
               loc=32;
        }
        return accum;
}
/*
        process_sample
        run all registered receiver algorithms on the latest sample
*/
void process_sample(double s, double o) {
        for (list<rxinfo>::iterator i=rxlist.begin(); i!=rxlist.end();
i++) {
               i->receiver->new_sample(s, o);
        }
}
/*
        generate_sample
        produce noisy gfsk samples from nrz samples
*/
double generate_sample(double nrz) {
        /* compute the phase */
        double phase=mphase+cphase+chirpphase;
        double ri=ampscale*cos(phase)+noisescale*noise();
        double rq=ampscale*sin(phase)+noisescale*noise();
        /* update the phases */
        double m=gfilter(nrz);
        mphase+=mphase_scale*m;
        cphase+=dcphase; if (cphase>2*PI) cphase-=2*PI;
        double chirpf=clip(adrift*triangle(chirpfphase), fmaxdrift);
        chirpphase+=chirpphase_scale*chirpf;
        if (chirpphase>2*PI) chirpphase-=2*PI;
        chirpfphase+=dchirpfphase;
        if (chirpfphase>2*PI) chirpfphase-=2*PI;
        /* discriminator */
        int ip = ( ri>=0.0 ? +1 : -1 ) ;
        int qp = ( rq>=0.0 ? +1 : -1 ) ;
        int det = qp*ip_z-qp_z*ip ;
        ip_z=ip;
        qp_z=qp;
        /* reconstruction */
        #define GGG           7.277254929000110e-05
        #define A11           -1.662009959637715e+00
        #define A12           6.945706597008273e-01
        #define A21           -1.825297781912184e+00
        #define A22           8.610574795349009e-01
        double stage1=(double) (det+2*det_z+det_zz)-A11*stage1_z-
A12*stage1_zz;
        double stage2=stage1+2*stage1_z+stage1_zz-A21*stage2_z-
A22*stage2_zz;
        stage2_zz=stage2_z; stage2_z=stage2;
        stage1_zz=stage1_z; stage1_z=stage1;
        det_zz=det_z; det_z=det;
        double out=GGG*stage2;
```

APPENDIX B-continued

```
// delay m by 17, mult by 8*fdev/fs and add 8*fif/fs to match out
// delay mrz by 17+16, mult by ditto and add ditto to match out
// cout << nrz << ' ' << m << ' ' out << ' ' chirpf << end1 ;
// cout << nrz << ' ' << m << ' ' mphase << ' ' << chirpphase <<
' ' <<
// out << end1 ;
        process_sample(out, 8.0*(fif+foff+chirpf)/fs);
        return out;
}
/*
        generate_symbol
        produce the samples for the symbol
*/
void generate_symbol(signed char s) {
        int i;
        for (i=0; i<spb; i++) { generate_sample((double)s); }
}
/*
        generate_bit
        produce a random bit and generate its symbol
*/
void generate_bit(void) {
        unsigned char b = random_bit() ? +1 : -1 ;
        truebits.new_bit(b);
        generate_symbol (b);
}
/*
        generate_preamble
*/
void generate_preamble() {
        int i;
        for (i=0; i<carrierbits; i++) { generate_symbol(0); }
        for (i=0; i<syncbits; i++) { generate_symbol( i&1 ? 1 : -1 ); }
}
int main(void) {
        int i;
        initialize();
        generate_preamble();
        for (i=0; i<skipbits; i++)       generate_bit();
        for (i=0; i<nbits; i++)          generate_bit();
        for (i=0; i<flushbits; i++)      generate_bit();
        for (list<rxinfo>::iterator i=rxlist.begin(); i!=rxlist.end();
i++) {
               i->receiver->printber(truebits, i->name, skipbits);
        }
        resources();
}
```

APPENDIX C

```
//*********************************************************
***
// RCS HEADER -- DO NOT ERASE
// $Author: johnl $
// $Id: mem.v,v 1.29 2000/06/08 00:10:56 johnl Exp $
// Pivotal Technologies
//*********************************************************
***
`define RAM_SIZE 512
`define RAM_ADDR 9
`define SCO_SIZE 32
`define SCO_ADDR 5
module byte_reader(reset,clk,dout,fetch,byte,update,align);
input reset,clk;
input fetch;       // fetch a bit    (to reader out)
input align;
input [7:0] byte;
output dout;
output update;     // grab a byte    (to write in)
reg [2:0] ptr;
assign dout = byte[ptr];
always @ (posedge reset or posedge clk)
```

APPENDIX C-continued

```verilog
      begin
         if (reset)
            ptr <= 3'd0;
         else if (align)
            ptr <= 3'd0;
         else if (fetch)
            ptr <= ptr + 1;
      end
   wire update = (ptr == 7) ? fetch : 1'b0;
endmodule
module byte_loader(reset,clk,din,valid,byte,load,flush);
   input reset,clk,din,valid;
   input flush; // OR of accept and reject
   output [7:0]   byte; wire [7:0] byte;
   output         load;
   reg [6:0] hold;
   reg [2:0] ptr;
   assign byte = { din, hold};
   always @ (posedge reset or posedge clk)
      begin
         if (reset)
            begin
               hold <= 7'd0;
               ptr <= 3'd0;
            end
         else if (flush)
            ptr <= 3'd0;
         else if (valid)
            begin
               hold[ptr] <= din;
               ptr <= ptr + 1;
            end
      end
   wire load =    (flush && ptr > 0) ? 1'b1:
                  (ptr == 7) ? valid : 1'b0;
endmodule
// for rx acl
module pipo_ctrl  (reset,clk,reject,accept,clear,next,
                   wr,rd,waddr,raddr,empty,full,more_data);
   input reset,clk,reject,accept,clear,next,wr,rd;
   output [`RAM_ADDR : 0] waddr, raddr;
   output    empty,full;
   reg       empty,full;
   reg       [`RAM_ADDR : 0] waddr, raddr;
   output more_data;
   reg [`RAM_ADDR :0] numitems0, numitems1;
   assign more_data = raddr[`RAM_ADDR] ?
   (numitems1 > 0) : (numitems0 > 0);
   always @ (posedge reset or posedge clk)
      begin
         if (reset)
            begin
               waddr = {1'b0,`RAM_ADDR'd0};
               raddr = {1'b0,`RAM_ADDR'd0};
               empty = 1'b1;
               full = 1'b0;
               numitems0 = {1'b0, `RAM_ADDR'd0};
               numitems1 = {1'b0, `RAM_ADDR'd0};
            end
         else
            begin
               if (wr)
                  waddr[`RAM_ADDR -1:0] = waddr[`RAM_ADDR -1:0] +1;
               if (rd)
                  begin
                     if (raddr[`RAM_ADDR])
                        numitems1 = numitems1 - 1;
                     else
                        numitems0 = numitems0 - 1;
                     raddr[`RAM_ADDR -1:0] = raddr[`RAM_ADDR -1:0] +1;
                  end
               if (accept && !full)
                  begin
                     if (waddr[`RAM_ADDR])
                        numitems1 = waddr[`RAM_ADDR -1:0];
                     else
                        numitems0 = waddr[`RAM_ADDR -1:0];
                     waddr[`RAM_ADDR]     = ~waddr[`RAM_ADDR];
                     waddr[`RAM_ADDR -1:0] = `RAM_ADDR'd0;
                     if (!empty) full = 1'b1;
                     else        empty = 1'b0;
                  end
               else if (reject)
                  begin
                     waddr[`RAM_ADDR -1:0] = `RAM_ADDR'd0;
                  end
               if (next && !empty)
                  begin
                     raddr[`RAM_ADDR]      = ~raddr[`RAM_ADDR];
                     raddr[`RAM_ADDR -1:0] = `RAM_ADDR'd0;
                     if (full) full = 1'b0;
                     else      empty = 1'b1;
                  end
               else if (clear)
                  begin
                     waddr = {1'b0,`RAM_ADDR'd0};
                     raddr = {1'b0,`RAM_ADDR'd0};
                     empty = 1'b1;
                     full = 1'b0;
                     numitems0 = {1'b0, `RAM_ADDR'd0};
                     numitems1 = {1'b0, `RAM_ADDR'd0};
                  end
            end
      end
endmodule
////////////////////////////
// RAM model //
////////////////////////////
module ram_model_dpx8x32 (clk, wr, wdata, rdata, waddr, raddr);
   input clk, wr;
   input    [`SCO_ADDR -1:0] waddr, raddr;
   input    [7:0] wdata;
   output   [7:0] rdata; wire   [7:0] rdata;
   reg      [`SCO_ADDR -1:0] raddr_stage;
// memory array
   reg   [7:0] ram[0:`SCO_SIZE -1] /* synthesis
   syn_ramstyle="block_ram" */ ;
   assign rdata = ram[raddr];   // read
   always @ (posedge clk) begin
      if (wr) ram[waddr] <= wdata;
   end
endmodule
module ram_model_spx8 (clk, wr, wdata, rdata, addr);
   input clk, wr;
   input    [`RAM_ADDR -1:0] addr;
   input    [7:0] wdata;
   output   [7:0] rdata; wire   [7:0] rdata;
   reg      [7:0] ram[0:`RAM_SIZE -1] /* synthesis
   syn_ramstyle="block_ram" */ ;
   assign rdata = ram[addr];   // read
   always @ (posedge clk) begin
      if (wr) ram[addr] <= wdata;
   end
endmodule
module ram_model2_dpx8 (clk, wr, wdata, rdata, waddr, raddr);
   input clk, wr;
   input    [`RAM_ADDR :0] waddr, raddr;
   input    [7:0] wdata;
   output   [7:0] rdata; wire   [7:0] rdata;
// memory array
   reg      [7:0] ram[0:`RAM_SIZE*2 -1] /* synthesis
   syn_ramstyle="block_ram" */ ;
   assign rdata = ram[raddr];   // read
   always @ (posedge clk) begin
      if (wr) ram[waddr] <= wdata;
   end
endmodule
module ram_model_dpx8 (clk, wr, wdata, rdata, waddr, raddr);
   input clk, wr;
   input    [`RAM_ADDR -1:0) waddr, raddr;
   input    [7:0] wdata;
   output   [7:0] rdata; wire   [7:0] rdata;
```

APPENDIX C-continued

```verilog
// memory array
reg     [7:0] ram[0:`RAM_SIZE -1] /* synthesis
syn_ramstyle="block_ram" */ ;
assign rdata = ram[raddr];    // read
always @ (posedge clk) begin
    if (wr) ram[waddr] <= wdata;
    end
endmodule
`define ELS 2
`define ELS_SIZE 4
module ram_model_dpx1 (clk, wr, din, dout, waddr, raddr);
input clk, wr;
input din;
input [`ELS -1:0] waddr, raddr;
output dout;
reg [0:`ELS_SIZE -1] ram;
assign dout = ram[raddr];
always @ (posedge clk) begin
    if (wr) ram(waddr) <= din;
    end
endmodule
///////////////////////////
// FIFO controller //
///////////////////////////
// for tx acl
module tito_ctrl   (clk, reset, wr, rd, got_tx, wait_for_ack,
                    addr, ack, sent, next, clear, restart);
input clk, reset;
input wr,rd;
input sent, ack;
input next, clear;    // from host
input restart;
output got_tx; reg got_tx;
output wait_for_ack; reg wait_for_ack;
output  [`RAM_ADDR -1 : 0] addr;
reg     [`RAM_ADDR -1 : 0] addr;
reg [1:0] state;
always @ (posedge reset or posedge clk)
    begin
        if (reset)
        begin
            addr = {`RAM_ADDR'd0};
            got_tx = 1'b0; // write from host
            wait_for_ack = 1'b0;
            end
        else if (clear)
        begin
            addr = {`RAM_ADDR'd0};
            got_tx = 1'b0; // write from host
            wait_for_ack = 1'b0;
            end
        else if (sent && got_tx) // at the end of tx
        begin
            addr = {`RAM_ADDR'd0};
            got_tx = 1'b1;
            wait_for_ack = 1'b1;
            end
        else if (ack & wait_for_ack) // at rx header
        begin
            addr = {`RAM_ADDR'd0};
            got_tx = 1'b0;
            wait_for_ack = 1'b0;
            end
        else if (next)    // host done writing, ready to send
        begin
            addr = {`RAM_ADDR'd0};
            got_tx = 1'b1;
            wait_for_ack = 1'b0;
            end
        else if (restart) // uc has to start again, eg timeout
        begin
            addr = {`RAM_ADDR'd0};
            wait_for_ack = 1'b0;
            end
        else if (wr | rd) // host writing or baseband reading to be transmitted
            addr = addr + 1;
        end
endmodule
// for sco buffers, tx and rx
module fifo_ctrl (clk, reset, wr, rd, waddr, raddr, full,
                  empty,numitems);
input clk, wr, rd, reset;
output [`SCO_ADDR -1: 0] waddr, raddr;
output full, empty;
output [`SCO_ADDR -1 :0] numitems;
reg [`SCO_ADDR -1 :0] waddr;
reg [`SCO_ADDR -1 :0] raddr;
reg [`SCO_ADDR    :0] numitems;
wire full, empty;
always @ (posedge clk or posedge reset)
    begin
        if (reset)
        begin
            waddr = `SCO_ADDR'd0;
            raddr = `SCO_ADDR'd0;
            numitems = {1'b0, `SCO_ADDR'd0 };
            end
        else
        begin
            if (wr && !full)
            begin
                waddr    =waddr + 1;
                numitems = numitems + 1;
                end
            if (rd && !empty)
            begin
                raddr    = raddr + 1;
                numitems = numitems - 1;
                end
            end
        end
assign full    = numitems[`SCO_ADDR];
assign empty   = (numitems == 0);
endmodule
module acl_fifo    (clk, reset, write, read, din, data, empty, full,
                    accept, reject, next, clear, more_data);
input clk, reset;
input write, read;
input din;         // from data path
input accept, reject;   // from uc
input next, clear;      // from host
output [7:0] data; wire [7:0] data;
output empty, full; wire empty, full;
output more_data;
wire load;
wire [`RAM_ADDR :0] waddr, raddr;
wire [7:0] byte;
ram_model2_dpx8 iram (.clk(clk),
                      .wr(load),        // from RF
                      .wdata(byte),     // from RF
                      .rdata(data),     // to uart
                      .waddr(waddr),
                      .raddr(raddr)
                      );
pipo_ctrl ictrl    (.reset(reset),
                    .clk(clk),
                    .reject(reject),
                    .accept(accept),
                    .clear(clear),
                    .next(next),
                    .wr(load),
                    .rd(read),
                    .waddr(waddr),
                    .raddr(raddr),
                    .more_data(more_data),
                    .empty(empty),
                    .full(full)
                    );
wire flush = accept | reject;
byte_loader ibyte (.reset(reset),
                   .clk(clk),
                   .din(din),
```

APPENDIX C-continued

```
                    .valid(write),
                    .byte(byte),
                    .load(load),
                    .flush(flush)
                    );
endmodule
module sco_fifo(clk, reset, din, data, write, read, empty,
full,align);
input clk, reset;
input din;
input write,read;
input align;   // end of packet
output empty, full; wire empty, full;
output [7:0] data; wire [7:0] data;
wire [7:0] byte;
wire [`SCO_ADDR -1 :0] waddr;
wire [`SCO_ADDR -1 :0] raddr;
wire [`SCO_ADDR    :0] numitems;
wire load;
ram_model_dpx8x32 iram   (.clk(clk),            // SCO
                    .wr(load),           // from RF
                    .wdata(byte),        // from RF
                    .rdata(data),        // to uart
                    .waddr(waddr),
                    .raddr(raddr)
                    );
fifo_ctrl ictrl    (.clk(clk),
                    .reset(reset),
                    .wr(load),
                    .rd(read),
                    .waddr(waddr),
                    .raddr(raddr),
                   .numitems(numitems),
                    .full(full)
                    .empty(empty)
                    );
byte_loader ibyte   (.reset(reset),
                    .clk(clk)
                    .din(din),
                    .byte(byte),
                    .valid(write),
                    .load(load),
                    .flush(align));
endmodule
// tx data (acl) fifo
module data_fifo   (clk, reset, write, read, dout, data, got_tx,
                    wait_for_ack, ack, sent, next, clear, restart);
input clk, reset;
input write, read;
input sent, ack; // tx_uc
input next, clear; // host
input [7:0] data;
input restart;
output dout;
output got_tx,wait_for_ack;
wire sent, ack;
wire next, clear;
wire dout;
wire update;
wire flush = ack | sent | next | clear | restart;
wire [7:0] byte;
wire [`RAM_ADDR -1:0] addr;
wire got_tx;
tito_ctrl itito (
    .clk(clk),
    .reset(reset),
    .wr(write)
    .rd(update),
    .got_tx(got_tx),
    .wait_for_ack(wait_for_ack),
    .addr(addr),
    .ack(ack),
    .sent(sent),
    .next(next),
    .restart(restart),
    .clear(clear)
    );
```

APPENDIX C-continued

```
byte_reader ibyte (
    .reset(reset),
    .clk(clk),
    .dout(dout),
    .fetch(read),
    .byte(byte),
    .update(update),
    .align(flush)
    );
ram_model_spx8 iram (
    .clk(clk),
    .wr(write),
    .wdata(data),
    .rdata(byte),
    .addr(addr)
    );
endmodule
// tx voice (sco) fifo
module voice_fifo(clk, reset, dout, data, write, read, empty,
full, align,numitems);
input clk, reset;
input write, read;
input [7:0] data;
output empty, full;
input align; // end of packet must be flush
output dout; wire dout;
output [`SCO_ADDR :0] numitems;
wire [7:0] byte;
wire [`SCO ADDR -1 :0] waddr;
wire [`SCO_ADDR -1 :0] raddr;
wire [`SCO_ADDR    :0] numitems;
byte_reader ibyte (
    .reset(reset),
    .clk(clk),
    .dout(dout),
    .fetch(read),
    .byte(byte),
    .update(update),
    .align(align)
    );
fifo_ctrl ictrl (
    .clk(clk),
    .reset(reset),
    .wr(write),
    .rd(update),
    .waddr(waddr),
    .raddr(raddr),
    .full(full),
    .numitems(numitems),
    .empty(empty)
    );
ram_model_dpx8x32 iram (
    .clk(clk)
    .wr(write),
    .wdata(data),
    .rdata(byte),
    .waddr(waddr),
    .raddr(raddr)
    );
endmodule
// INTRODUCTIN:
// data buffer can be configured to function as 7 fifos, and
more . . .
// the hardware views the data buffer as 7 fifo, each fifo
starting
// at its corresponding location of the 7 sl_addr registers.
// the software view the data buffer as one big contiguous memory,
// it can burst in data starting at any location.
// OPERATION:
// 0. at initialization, software load the 7 fifo starting address
//    and define the 7 fifos for the hardware.
// 1. during transmittion, software init the host_addr counter,
//    then burst in data starting at the host_addr counter.
//    (usually at the corresponding sl_addr of the intended slave,
//    but doesn't have to be)
// 2. once software completed loading data (usually a packet),
//    software can flip one of the 7 ok2send bits to indicate
//    to hardware that a packet is ready to be sent to the slave
//    as indicated by the corresponding got_tx bits.
```

APPENDIX C-continued

```
// 3. when the tx slot to that slave arrives, hardware initializes
//    read counter with the sl_addr of the slave, and read off the
//    message from the buffer.
// 4. when hard successfully transmitted the message, it flip the
//    got_tx bit to indicate to software that the slave's fifo is
ready
//    for another message
// TRICK USE:
// 5. the software can use the same bursting mechanism to burst
into
//    the same memory location again (repeating step 1.2).
//    OR, it might have loaded another packet in another area of
the
//    memory.
// 6. the software can then change the corresponding sl_addr to
//    this new location, and flip the ok2send (and got_tx) again!!
//    and essentially achieve ping-pong fifo.
// 7. this is also an easy way to broadcast a message to only
selected
//    slaves, the software does not have to reload the packet.
module data_buffer(clk, reset, host_wr, path_rd, dout, data,
got_tx,
                   wait_for_ack, ack, sent, ok2send, flush, restart,
start_tx,
               sl_addr1, sl_addr2, sl_addr3, sl_addr4, sl_addr5,
               sl_addr6, sl_addr7, host_data_bus, host_addr_out,
                   host_addr_init0, host_addr_init1,
                   path_sl_sel, host_sl_sel
                   );
input clk, reset;
input host_wr, path_rd; // host write, path bitwise read
input start_tx;
input sent, ack;// tx_uc
input ok2send,flush; // host next, host clear
input [7:0] data;
input [2:0] path_sl_sel, host_sl_sel;
input [`RAM_ADDR -1:0] sl_addr1, sl_addr2, sl_addr3, sl_addr4,
               sl_addr5, sl_addr6, sl_addr7;
input [7:0] host_data_bus;
output [`RAM_ADDR -1:0] host_addr_out;
input host_addr_init0, host_addr_init1;
input restart;    // restart the queue selected by path_sl_sel
output dout;
output got_tx,wait_for_ack;
reg [`RAM_ADDR -1:0] host_addr, path_addr;
reg [7:0] got_tx_array;
reg [7:0] wait_ack_array;
wire path_byte_rd;
assign host_addr_out = host_addr;
always @ (posedge clk or posedge reset)
    if (reset)
        host_addr <= `RAM_ADDR'd0;
    else if (host_addr init0)
        host_addr[7:0] <= host_data_bus;
    else if (host_addr_init1)
        host_addr[`RAM_ADDR -1:8] <= host_data_bus;
    else if (host_wr)
        host_addr <= host addr + 1;
    else;
always @ (posedge clk or posedge reset)
    if (reset)
        path_addr <= `RAM_ADDR'd0;
    else if (start_tx)
        case (path_sl_sel)
        3'd1: path_addr <= sl_addr1;
        3'd2: path_addr <= sl_addr2;
        3'd3: path_addr <= sl_addr3;
        3'd4: path_addr <= sl_addr4;
        3'd5: path_addr <= sl_addr5;
        3'd6: path_addr <= sl_addr6;
        3'd7: path_addr <= sl_addr7;
        default
                path_addr (= `RAM_ADDR'd0;
        endcase
    else if (path_byte_rd)
        path_addr <= path_addr + 1;
    else;

wire [7:0] byte;
byte_reader ibyte (
    .reset(reset),
    .clk(clk),
    .dout(dout),
    .fetch(path_rd),
    .byte(byte),
    .update(path_byte_rd),
    .align(start_tx)
    );
ram_model_dpx8 iram (
    .clk(clk),
    .wr(host_wr),      // from RF
    .wdata(data),      // from host
    .rdata(byte),      // to path
    .waddr(host_addr),
    .raddr(path_addr)
    );
always @ (posedge reset or posedge clk)
    begin
    if (reset)
        begin
        got_tx_array = 8'd0;
        wait_ack_array = 8'd0:
        end
    else
        begin
        got_tx_array [host_sl_sel]    = (got_tx_array[host_sl_sel] |
ok2send) & ~flush;
        wait_ack_array [host_sl_sel] = wait_ack_array[host_sl_sel] &
~(flush | ok2send);
        if (sent)
            wait_ack_array[path_sl_sel] = got_tx_array[path_sl_sel];
        else if (ack)
            begin
            wait_ack_array[path_sl_sel] = 1'b0;
            got_tx_array[path_sl_sel] = wait_ack_array[path_sl_sel] ?
1'b0 :
                              got_tx_array[path_sl_sel];
            end
        else if (restart)
            wait_ack_array[path_sl_sel] = i'b0;
        else;
        end
end
wire got_tx = got_tx_array[path_sl_sel];
wire wait_for_ack = wait_ack_array[path_sl_sel];
endmodule
// e-buffer is size 8
module
elastic_buff(clk,reset,din,jam,dout,empty,full,fetch,hop_start);
input clk, reset;
input din,jam; // input from demod, this is asynchronous
input fetch; // baseband grabbing data
input hop_start; // clear the buffer
output dout; // data out to baseband
output empty,full; // indicate to baseband
//reg write0, write1;
//always @ (posedge clk or posedge reset)
//    begin
//    if (reset)
//        begin
//        write0 <= 1'b0;
//        write1 <= 1'b0;
//        end
//    else
//        begin
//        write0 <= jam;
//        write1 <= write0;
//        end
//    end
//
//wire write = (write0 == 1'b1 && write1 == 1'b0) ? 1'b1 : 1'b0;
wire write = jam;
wire read = fetch;
reg [`ELS:0] numitems;
reg [`ELS -1:0] waddr, raddr;
always @ (posedge clk or posedge reset)
```

APPENDIX C-continued

```
begin
    if (reset || hop_start)
        begin
            waddr = `ELS'd0;
            raddr = `ELS'd0;
            numitems = {1'b0, `ELS'd0};
        end
    else
        begin
            if (write && !full)
                begin
                    waddr = waddr + 1;
                    numitems = numitems + 1;
                end
            if (read && !empty)
                begin
                    raddr = raddr + 1;
                    numitems = numitems - 1;
                end
        end
    end
wire empty = (numitems == 0) ? 1'b1 : 1'b0;
wire full = numitems[`ELS];
ram_model_dpx1 iram (.clk(clk),
                     .wr(write),
                     .din(din),
                     .dout(dout),
                     .waddr(waddr),
                     .raddr(raddr)
                     );
endmodule
```

APPENDIX D

```
INCLUDE "bt_format"
FILLER "X"
assemble length
    org 0
    rx_start:
     0 branch end_of_packet,id_only
    parse_header:
     1 active enable_white
     2 active enable_hec
     3 active decode_fec1
     4 force 0,accu
     5 parse demod,bucket,9 /* align upto am_addr */
     6 verify 0x07,am_addr
     7 branch am_addr_match,true
    am_addr_mismatch:
     8 or_into 0x01,accu
    am_addr_match:
     9 parse demod,bucket,1 /* shift in last bit of the header */
    10 inject bucket,2 /* align up to type */
    11 store type
    12 inject bucket,4 /* align up to flow shift out type */
    13 store flow
    14 inject bucket,1 /* align up to arqn, shift out flow */
    15 store arqn
    16 inject bucket,1 /* align up to seqn, shift out arqn */
    17 verify 0x01,seqn /* seqn_new == seqn_old ? */
    18 branch seqn_is_new,false
    19 or_into 0x02,accu /* seqn is old */
    seqn_is_new:
    20 parse demod,bucket,8 /* cycle thru hec */
    21 release decode_fec1
    22 release enable_hec /* at this moment, 1 seqn + 8 hec is in shift */
    process_header:
    23 branch reject_payload,crc_failed /* if hec error */
    24 compare 0x01,accu,0x01 /* if am_addr mismatch */
    25 branch end_of_packet,true
    26 compare 12,type,0x0f /* undefined type */
    27 branch end_of_packet,true
    28 compare 13,type,0x0f /* undefined type */
    29 branch end_of_packet,true
```

APPENDIX D -continued

```
    30 compare 0x00,arqn,0x01 /* if there was no ack */
    31 branch dontcare_seqn,true /* if not acknowledge */
    acknowledged:
    32 call sb_ack_previous_acl,wait_for_ack /* if tx_fifo is
       waiting to be acked */
    dontcare_seqn:
    33 compare 1,type,0x0f /* poll */
    34 branch process_poll,true
    35 compare 0,type,0x0f /* null */
    36 branch end_of_packet,true
    37 compare 5,type,0x0f /* hv1 */
    38 branch process_hv1,true
    39 compare 6,type,0x0f /* hv2 */
    40 branch process_hv2,true
    41 compare 7,type,0x0f /* hv3 */
    42 branch process_hv3,true
    43 compare 8,type,0x0f /* dv */
    44 branch process_dv,true
    but_care_fifo_full:
    45 branch reject_payload,full /* it's full */
    46 compare 2,type,0x0f /* fhs */
    47 branch process_fhs,true
    48 compare 9,type,0x0f /* aux1 */
    49 branch process_aux1,true
    care_about_seqn:
    50 compare 0x02,accu,0x02 /* if seqn is old */
    51 branch redundant_payload, true
    52 compare 3,type,0x0f /* dm1 */
    53 branch process_dm1,true
    54 compare 10,type,0x0f /* dm3 */
    55 branch process_dm3,true
    56 compare 14,type,0x0f /* dm5 */
    57 branch process_dm5,true
    58 compare 4,type,0x0f /* dh1 */
    59 branch process_dh1,true
    60 compare 11,type,0x0f /* dh3 */
    61 branch process_dh3,true
    62 compare 15,type,0x0f /* dh5 */
    63 branch process_dh5,true
    64 branch end_of_packet,always
    sb_ack_previous acl:
    65 active ack /* tx fifo acknowledge, allows new tx data packet */
    66 increase 1,seqnx /* toggle seqn back to the other */
    67 rtn,
    sb_inject_type:
    68 preload type
    69 inject acl,8
    70 rtn,
    sb_inject_temp:
    71 preload temp
    72 inject acl,8
    73 rtn,
    process_poll:
    74 force 1,seqnx
    75 force 0,seqn
    76 branch end_of_packet,always
    process_dm1:
    77 force 3,temp
    78 call sb_inject_temp, always
    79 active enable_crc
    80 active decode_fec2
    81 parse demod,acl,3 /* parse in lch + flow */
    82 parse demod,acl,5 /* parse in 5 bit packetlength */
    83 inject bucket,4 /* align packet length */
    84 store stuff_counter
    85 stuff demod,acl
    86 parse demod,bucket,16 /* cycle through the crc */
    87 release enable_crc
    88 release decode_fec2
    89 branch reject_payload,crc_failed
    90 branch accept_payload,always
    process_dm3:
    process_dm5:
    91 call sb_inject_type,always
    92 active enable_crc
    93 active decode_fec2
    94 parse demod,acl,3 /* parse in lch+flow */
```

-continued

APPENDIX D

```
 95 parse demod,acl,9 /* packet length */
 96 store stuff_counter
 97 parse demod,acl,4 /* undefined */
 98 stuff demod,acl
 99 parse demod,bucket,16 /* cycle through the crc
100 release enable_crc
101 release decode_fec2
102 branch reject_payload,crc_failed
103 branch accept_payload,always
process_dh1:
104 active enable_crc
105 active decode_fec0
106 call sb_inject_type,always
107 parse demod,acl,3 /* L_CH + flow */
108 parse demod,acl,5 /* packet counter */
109 inject bucket,4 /* align it to 9 */
110 store stuff_counter
111 stuff demod,acl
112 parse demod,bucket,16 /* cycle through the crc
113 release enable_crc
114 release decode_fec0
115 branch reject_payload,crc_failed
116 branch accept_payload,always
process_dh3:
process_dh5:
117 call sb_inject_type,always
118 active enable_crc
119 active decode_fec0
120 parse demod,acl,3 /* 1_ch+flow */
121 parse demod,acl,9 /* payload length */
122 store stuff_counter
123 parse demod,acl,4 /* undefined */
124 stuff demod,acl
125 parse demod,bucket,16 /* cycle through the crc
126 release enable_crc
127 release decode_fec0
128 branch reject_payload,crc_failed
129 branch accept_payload,always
process_aux1:
130 active decode_fec0
131 call sb_inject_type,always
132 parse demod,acl,3 /* L_CH + flow */
133 parse demod,acl,5 /* payload length */
134 inject bucket,4 /* make it 9 */
135 store stuff_counter
136 stuff demod,acl
137 release decode_fec0
138 active accept
139 branch end_of_packet,always
process_fhs:
140 active enable_crc
141 active decode_fec2
142 call sb_inject_type,always
143 parse demod,acl,72
144 store fhs0
145 parse demod,acl,72
146 store fhs1
147 parse demod,bucket,16 /* cycle through the crc */
148 preload clk_offset
149 inject acl,32 /* send clock offset to host */
150 release enable_crc
151 release decode_fec2
152 branch reject_payload,crc_failed
153 branch accept_payload,always
process_hv1:
154 active decode_fec1
155 force 10,stuff_counter
156 branch process_hv1_into_acl,sco2acl
157 stuff demod,sco
158 branch process_hv1_end,always
process_hv1_into_acl:
159 branch process_hv1_end,full
160 call sb_inject_type,always
161 stuff demod,acl
162 active accept
process_hv1_end:
163 release decode_fec1
164 branch end_of_packet,always
process_hv2:
165 active decode_fec2
166 force 20,stuff_counter
167 branch process_hv2_into_acl,sco2acl
168 stuff demod,sco
169 branch process_hv2_end,always
process_hv2_into_acl:
170 branch process_hv2_end,full
171 call sb_inject_type,always
172 stuff demod,acl
173 active accept
process_hv2_end:
174 release decode_fec2
175 branch end_of_packet,always
process_hv3:
176 active decode_fec0
177 force 30,stuff_counter
178 branch process_hv3_into_acl,sco2acl
179 stuff demod,sco
180 branch process_hv3_end,always
process_hv3_into_acl:
181 branch process_hv3_end,full
182 call sb_inject_type,always
183 stuff demod,acl
184 active accept
process_hv3_end:
185 release decode_fec0
186 branch end_of_packet,always
process_dv:
dv_voice:
187 active decode_fec0
188 force 10,stuff_counter
189 branch process_dv_into_acl,sco2acl
190 stuff demod,sco
191 branch process_dv_voice_end,always
process_dv_into_acl:
192 branch process_dv_voice_end,full
193 force 5,temp
194 call sb_inject_temp,always
195 stuff demod,acl
196 active accept
process_dv_voice_end:
197 release decode_fec0
dv_data:
198 branch reject_payload,full /* it's full */
199 compare 0x02,accu,0x02 /* if seqn is old */
200 branch reject_payload,true
201 branch process_dm1,always
reject_payload:
202 force 0, arqnx
203 active reject
204 branch end_of_packet,always
accept_payload:
205 force 1, arqnx
206 increase 1,seqn
207 active accept
208 branch end_of_packet,always
redundant_payload:
209 force 1,arqnx
not_my_payload:
210 active reject
end_of_packet:
211 release enable_white
212 sleep
org 224
bypass_start:
224 branch bypass_end,full
225 force 256,stuff_counter
226 active decode_fec0
227 stuff demod,acl
228 active accept
229 release decode_fec0
bypass_end:
230 sleep
org 256
tx_start:
```

APPENDIX D

```
256 branch end_of_packet,id_only
   must_send_header:
257 active enable_white
258 active enable_hec
259 active encode_fec1
260 preload am_addr
261 inject mod,3
262 compare 1,typex,0x0f /* poll */
263 branch transmit_poll,true
264 compare 0,typex,0x0f /* null */
265 branch transmit_null,true
266 compare 5,typex,0x0f /* hv1 */
267 branch transmit_hv1,true
268 compare 6,typex,0x0f /* hv2 */
269 branch transmit_hv2,true
270 compare 7,typex,0x0f /* hv3 */
271 branch transmit_hv3,true
272 compare 8,typex,0x0f /* dv */
273 branch transmit_dv,true
274 branch slave_skip,is_master /* fhs in slave doesn't need ack */
275 compare 2,typex,0x0f /* fhs in slave */
276 branch transmit valid,true /* no need to wait for got_tx
   slave_skip:
277 compare 12,typex,0x0f /* undefined */
278 branch transmit_null,true
279 compare 13,typex,0x0f /* undefined */
280 branch transmit_null,true
281 branch transmit_valid,got_tx
   transmit_null:
282 force 0,temp
283 preload temp
284 call sb_transmit_header_after_type,always
285 branch end_of_packet,always
   transmit_poll:
286 force 1,seqnx
287 force 0,seqn
288 force 1,temp
289 preload temp
290 call sb_transmit_header_after_type,always
291 branch end_of_packet,always
   transmit_valid:
292 compare 0,flow,0x01 /* go = 1, stop = 0 */
293 branch transmit_null,true
294 preload typex
295 call sb_transmit_header_after_type,always
   transmit_payload:
296 compare 2,typex,0x0f /* fhs */
297 branch transmit_fhs,true /* master mode fhs need got_tx
    and ack */
   transmit_data_payloads:
298 compare 3,typex,0x0f /* dm1 */
299 branch transmit_dm1,true
300 compare 10,typex,0x0f /* dm3 */
301 branch transmit_dm3,true
302 compare 14,typex,0x0f /* dm5 */
303 branch transmit_dm5,true
304 compare 4,typex,0x0f /* dh1 */
305 branch transmit_dh1,true
306 compare 11,typex,0x0f /* dh3 */
307 branch transmit_dh3,true
308 compare 15,typex,0x0f /* dh5 */
309 branch transmit_dh5,true
310 branch transmit_aux1,always /* must be type=9, aux1 */
   transmit_fhs:
311 active enable_crc
312 active encode_fec2
313 preload fhs0
314 inject mod,72
315 preload fhs1
316 inject mod,72
317 active enable_parity /* enable_crc/hec must remain acitve */
318 inject mod,16
319 release enable_parity
320 release encode_fec2
321 release enable_crc
322 branch end_of_packet,always
   transmit_dm1:
323 active enable_crc
324 active encode_fec2
325 parse data,mod,3 /* send 1ch+flow */
326 parse data,mod,5 /* parse in 5 bit packet length */
327 inject bucket,4 /* align length */
328 store stuff_counter
329 stuff data,mod
330 active enable_parity
331 inject mod,16 /* generate CRC */
332 release enable_parity
333 release enable_crc
334 release encode_fec2
335 active sent
336 branch end_of_packet, always
   transmit_dm3:
   transmit_dm5:
337 active enable_crc
338 active encode_fec2
339 parse data,mod,3 /* send lch+flow */
340 parse data,mod,9 /* parse in 9 bit packet length */
341 store stuff_counter
342 parse data,mod,4 /* undefined */
343 stuff data,mod
344 active enable_parity
345 inject mod,16 /* generate CRC */
346 release enable_parity
347 release encode_fec2
348 release enable_crc
349 active sent
350 branch end_of_packet, always
   transmit_dv:
351 copy v_numitems,temp
352 increase 0xff6,temp /* add −10 */
353 compare 0x100,temp,0x100 /* check to see if negative, ie,
    numitems < 10 */
354 branch dv_hv1_enough,false /* enough for hv1 */
355 branch dv_dm1_only,got_tx /* enough only for dm1 */
356 branch transmit_null,always /* not enough for anything */
   dv_hv1_enough:
357 compare 0,flow,0x01 /* 1=go, 0=stop */
358 branch dv_hv1_only,true
359 branch dv_hv1_dm1_both,got_tx
   dv_hv1_only:
360 force 5,temp /* send hv1 instead */
361 preload temp
362 call sb_transmit_header after_type,always
363 branch transmit_hv1_payload,always
   dv_dm1_only:
364 compare 0,flow,0x01 /* go = 1, stop = 0 */
365 branch transmit_null,true
366 force 3 temp /* send dm1 instead */
367 preload temp
368 call sb_transmit_header_after_type,always
369 branch transmit_dm1,always
   dv_hv1_dm1_both:
370 preload typex
371 call sb_transmit_header after_type,always
372 active encode_fec0
373 force 10,stuff_counter
374 stuff voice,mod
375 release encode_fec0
376 branch transmit_dm1,always
   transmit_aux1:
377 active encode_fec0
378 parse data,mod,3
379 parse data,mod,5
380 inject bucket,4 /* align it to 9 */
381 store stuff_counter
382 stuff data,mod
383 release encode_fec0
384 active sent
385 active ack
386 branch end_of_packet,always
   transmit_dh1:
387 active enable_crc
388 active encode_fec0
389 parse data,mod,3 /* send 1ch+flow */
```

APPENDIX D

```
390 parse data,mod,5
391 inject bucket,4 /* align it to 9 */
392 store stuff_counter
393 stuff data,mod
394 active enable_parity
395 inject mod,16 /* send crc
396 release enable_parity
397 release enable_crc
398 release encode_fec0
399 active sent
400 branch end_of_packet,always
 transmit_dh3:
 transmit_dh5:
401 active enable_crc
402 active encode_fec0
403 parse data,mod,3 /* send lch+flow */
404 parse data,mod,9
405 store stuff_counter
406 parse data,mod,4 /* undefined */
407 stuff data,mod
408 active enable_parity
409 inject mod,16
410 release enable_parity
411 release enable_crc
412 release encode_fec0
413 active sent
414 branch end_of_packet,always
 transmit_hv1:
415 copy v_numitems,temp
416 increase 0xff6,temp /* add -10 */
417 compare 0x100,temp,0x100 /* check to see if negative, ie,
    numitems < 10 */
418 branch transmit_null,true /* not enough for hv1 */
419 preload typex
420 call sb_transmit_header_after_type,always
 transmit_hv1_payload:
421 active encode_fec1
422 force 10, stuff_counter /* 10 bytes, 80 bits, 240 bits after fec */
423 stuff voice,mod
424 release encode_fec1
425 branch end_of_packet,always
 transmit_hv2:
426 copy v_numitems,temp
427 increase 0xfec,temp /* add -20 */
428 compare 0x100,temp,0x100 /* check to see if negative, ie,
    numitems < 20 */
429 branch transmit_null,true /* not enough for hv2 */
430 preload typex
431 call sb_transmit_header_after_type,always
432 active encode_fec2
433 force 20,stuff_counter /* 20 bytes, 160 bits, 240 bits after fec */
434 stuff voice,mod
435 release encode_fec2
436 branch end_of_packet,always
 transmit_hv3:
437 copy v_numitems,temp
438 increase 0xfe2,temp /* add -30 */
439 compare 0x100,temp,0x100 /* check to see if negative, ie,
    numitems < 30 */
440 branch transmit_null,true /* not enough for hv3 */
441 preload typex
442 call sb_transmit_header_after_type,always
443 active encode_fec0
444 force 30 stuff_counter /* 30 bytes, 240 bits, no fec */
445 stuff voice,mod
446 release encode_fec0
447 branch end_of_packet,always
 sb_transmit_header_after_type:
448 inject mod,4
449 preload flowx
450 inject mod,1
451 preload arqnx
452 inject mod,1
453 preload seqnx
454 inject mod,1
455 active enable_parity
456 inject mod,8 /* transmit parity */
457 release enable_parity
458 release enable_hec
459 release encode_fec1
460 rtn ,
 org 511
511 sleep
 end
 file "bt_rom"
```

We claim:

1. A wireless receiver comprising:

a receiver that receives a wireless signal;

a demodulator coupled to the receiver, the demodulator recovering a data signal and a first clock signal from a signal output by the receiver;

a host generating a second clock signal;

a first-in first-out memory (FIFO) coupled to the demodulator to receive the data signal and the first clock signal, wherein the FIFO stores the data signal in synchronization with the first clock signal, and wherein the FIFO is coupled to the host to receive the second clock signal.

2. The wireless receiver of claim 1, wherein the receiver is an RF circuit.

3. The wireless receiver of claim 2, further comprising an antenna coupled to the RF circuit.

4. The wireless receiver of claim 1, wherein the FIFO outputs an output data signal in synchronization with the second clock signal.

5. The wireless receiver of claim 4, wherein the storing of the data signal and the outputting of the output data signal occur at substantially the same rate.

6. The wireless receiver of claim 4, wherein the host is coupled to the FIFO to receive the output data signal.

7. The wireless receiver of claim 6, wherein the storing of the data signal and the outputting of the output data signal occur at substantially the same rate.

8. The wireless receiver of claim 4, further comprising a data processing circuit coupled to the FIFO to receive the output data signal.

9. The wireless receiver of claim 8, wherein the data processing circuit includes one of a forward error correction circuit, a cyclical redundancy check circuit, a de-whitening circuit, a second FIFO, a clock, a microcontroller, and a host interface to generate a processed data signal.

10. The wireless receiver of claim 8, wherein the host is coupled to the data processing circuit to receive the processed data signal.

11. The wireless receiver of claim 8, wherein the FIFO further outputs a full or empty signal to the data processing circuit.

12. The wireless receiver of claim 8, wherein the storing of the data signal and the outputting of the output data signal occur at substantially the same rate.

13. The wireless receiver of claim 1, wherein the FIFO outputs an output data signal at substantially the same rate as the data signal is stored in the FIFO.

14. The wireless receiver of claim 1, wherein the FIFO is coupled to the host to output an output data signal to the host.

15. A method for receiving data comprising:

receiving a wireless signal;

recovering a data signal and a first clock signal from the received signal; and storing the data signal into a first-in first-out memory in synchronization with the first clock signal; and providing, by a host, a second clock signal to the first-in first-out memory.

16. The method of claim 15, wherein the wireless signal is an RF signal.

17. The method of claim 15, further comprising reading the stored data signal from the memory in synchronization with the second clock signal.

18. The method of claim 17, wherein the storing and the reading occur at substantially the same rate.

19. The method of claim 15, further comprising outputting the stored data signal to the host.

20. The method of claim 19, wherein the stored data signal is output from the memory in synchronization with the second clock signal.

21. The method of claim 19, wherein the storing and the outputting occur at substantially the same rate.

22. The method of claim 15, further comprising performing at least one of forward error correction, de-whitening, and cyclical redundancy check on the stored data signal to generate processed data.

23. The method of claim 17, further comprising outputting the processed data to the host.

24. The method of claim 15, further comprising reading the stored data signal from the memory at substantially the same rate as the data signal is stored in the memory.

* * * * *